United States Patent
Takahashi et al.

(10) Patent No.: US 8,191,986 B2
(45) Date of Patent: Jun. 5, 2012

(54) IMAGE FORMING APPARATUS

(75) Inventors: Hiroshi Takahashi, Kanagawa (JP); Masato Kobayashi, Kanagawa (JP); Tomonori Kimura, Kanagawa (JP); Kazushi Takei, Tokyo (JP); Yuichi Sakurada, Tokyo (JP); Nobuyuki Satoh, Kanagawa (JP); Yasuo Sakurai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 529 days.

(21) Appl. No.: 12/457,791

(22) Filed: Jun. 22, 2009

(65) Prior Publication Data

US 2009/0316164 A1 Dec. 24, 2009

(30) Foreign Application Priority Data

Jun. 23, 2008 (JP) .................................. 2008-162792

(51) Int. Cl.
*B41J 29/393* (2006.01)
(52) U.S. Cl. ........................................................ 347/19
(58) Field of Classification Search ...................... 347/19
See application file for complete search history.

(56) References Cited

U.S. PATENT DOCUMENTS

| 6,726,303 | B2 * | 4/2004 | Otsuki ............................ 347/19 |
| 7,272,343 | B2 | 9/2007 | Takahashi et al. |
| 2007/0008370 | A1 * | 1/2007 | Kawatoko et al. ............. 347/19 |
| 2011/0122184 | A1 | 5/2011 | Kimura et al. |

FOREIGN PATENT DOCUMENTS

| JP | 2000-296609 | 10/2000 |
| JP | 2005-335343 | 12/2005 |
| JP | 2007-038662 | 2/2007 |

\* cited by examiner

*Primary Examiner* — Julian Huffman
(74) *Attorney, Agent, or Firm* — Harness, Dickey & Pierce, P.L.C.

(57) ABSTRACT

An image forming apparatus is disclosed that includes a recording head having a plurality of nozzles and scanning in forward and backward scanning directions to form dot images on the recording medium, an imaging unit imaging an image on the recording medium, a detection unit detecting a positional shift amounts of the dot images and inclination amounts of the recording head based on calibration image data obtained by imaging two first marks and two second marks in a single view by the imaging unit, and a correction unit correcting a drive of the recording head based on the detected positional shift amounts and the inclination amounts of the recording head.

7 Claims, 17 Drawing Sheets

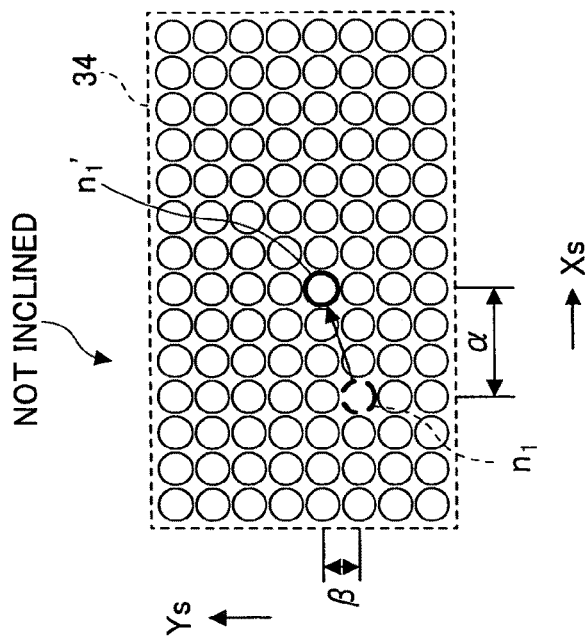
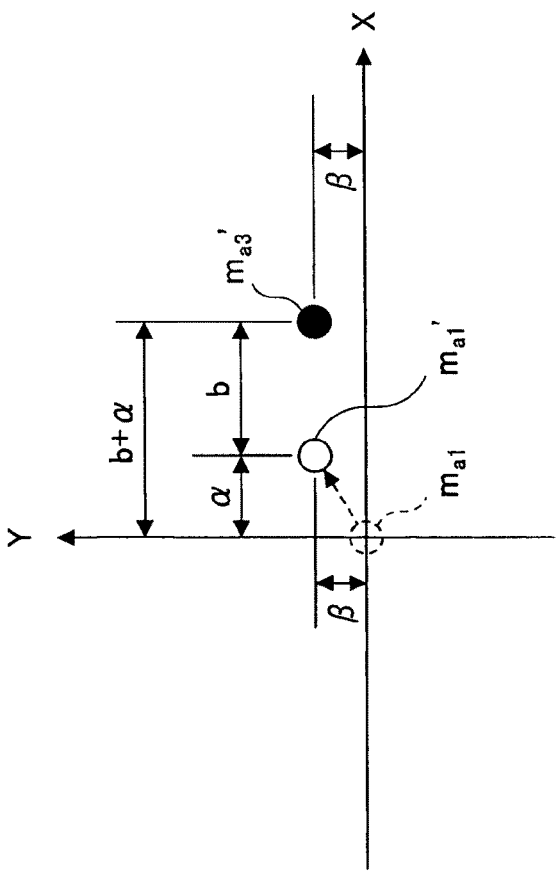

CARRIAGE INCLINED BY θ

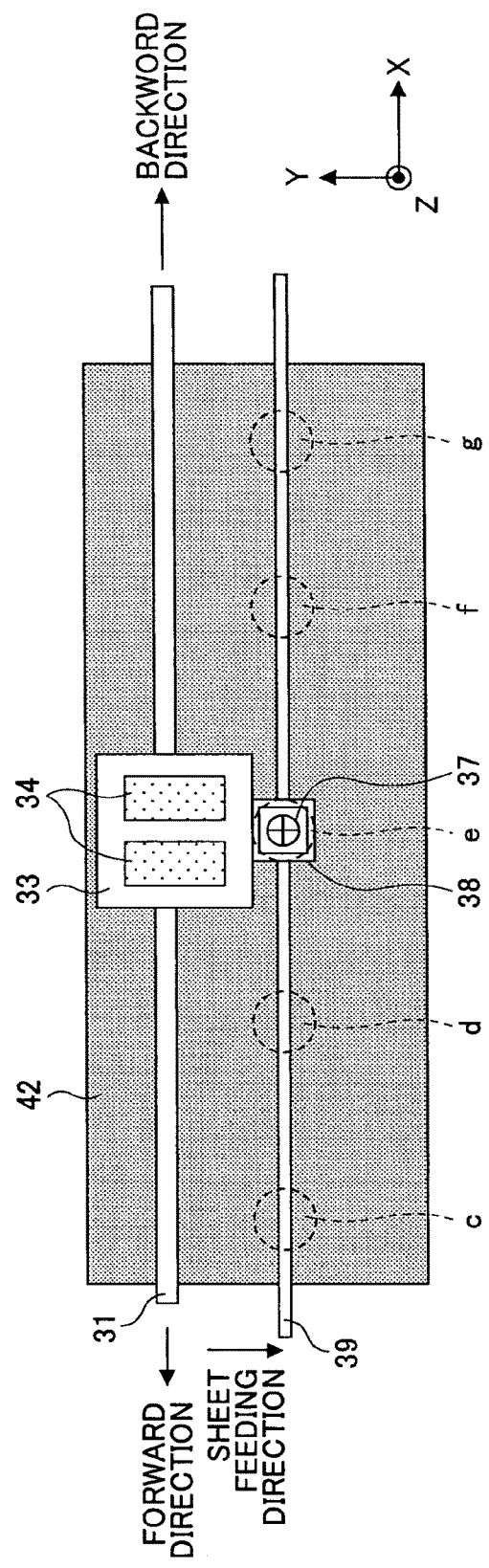

IMAGE FORMING APPARATUS

CROSS-REFERENCE TO RELATED APPLICATIONS

The present application claims priority under 35 U.S.C §119 to Japanese Patent Application Publication No. 2008-162792 filed Jun. 23, 2008, the entire contents of which are hereby incorporated herein by reference.

BACKGROUND OF THE INVENTION

1. Field of the Invention

The present invention generally relates to an image forming apparatus such as an inkjet recording apparatus, and more particularly to a technique of correcting a recording position of image data in an image forming apparatus having the recording head capable of performing bi-directional scanning in the main-scanning direction to form the image data.

2. Description of the Related Art

Generally, there has been known an image forming apparatus having its image forming section employing an electrophotographic image forming method such as a printer, a facsimile machine, a copier, or a multifunction peripheral having such functions. Some image forming apparatuses include the image forming section employing an inkjet printing method by which an image is formed (terms recorded, printed, imaged, typed may be used as synonyms of the term formed) by adhering the droplets of a recording liquid (ink) (hereinafter may be referred to as ink droplets) to a recording medium to be printed (hereinafter may be referred to as a sheet, the material of the sheet is not limited, and a recording medium, transfer material and the like may be used as synonyms) by using a recording head constituted by an ink liquid ejection head for ejecting the droplets of recording ink liquid.

In such an image forming apparatus employing the inkjet printing method, an image is recorded by scanning a carriage on which the recording head is mounted in both the forward direction and the backward direction along the main-scanning direction and intermittently feeding the recording medium in the sub-scanning direction. More specifically, when the carriage having the recording head is scanned in both forward and backward directions, an encoder scale disposed in the main scanning direction is detected by an optical sensor so that the positional information of the carriage is obtained; the ejection timing of the recording head based on the obtained positional information is generated; and ink is ejected from the recording head at the generated ejection timings, so that the image is recorded on the recording medium.

However, there may arise a problem that when an image is formed by scanning in both forward and backward directions in the main-scanning direction (i.e., in bi-directional printing), the recorded positions may be shifted (displaced) due to the shifted positions between the dots formed in the forward scanning and the dots formed in the backward scanning.

To overcome the problem, Japanese Patent Application Publication No. 2005-335343 proposes a technique in which the shift amount of ink landing positions in the sub-scanning direction is corrected by detecting the shift amount in the sub-scanning direction between the forward direction and the backward direction along the sub-scanning direction and adjusting the feeding amount of the recording medium.

On the other hand, Japanese Patent Application Publication No. 2000-296609 proposes a technique in which the shift of ink landing positions in the main-scanning direction is corrected by detecting the shift amount in the main-scanning direction between the forward direction and the backward direction in the main-scanning direction and adjusting the driving timing to the recording head.

However, in the Japanese Patent Application Publication Nos. 2000-296609 and 2000-296609, the positional shift amount is detected in only one of the main-scanning direction and the sub-scanning direction. Therefore, the correction performed may not be accurate enough.

SUMMARY OF THE INVENTION

The present invention is made in light of the above problem and may provide an image forming apparatus capable of controlling (reducing) the shift amount of the recording positions by detecting a positional shift amount not only in the main-scanning direction and but also in the sub-scanning direction and an inclination amount (angle) of the recording head both of the forward scanning and the backward scanning by making a simple and easy addition to the configuration.

The inventors of the present invention have achieved the present invention by paying attention to the fact that it is not only the positional shift amounts in both main-scanning direction and the sub-scanning direction but also the inclined angle of the carriage (i.e., recording head) in both forward and backward scanning processes that may cause the shift of the recorded dot positions, and doing research by considering this matter.

According to an aspect of the present invention, an image forming apparatus is disclosed that includes a recording head having a plurality of nozzles each ejecting ink onto a recording medium, the nozzles constituting nozzle lines arranged in a sub-scanning direction parallel to a feeding direction of the recording medium and in a main-scanning direction orthogonal to the feeding direction, the recording head being configured to scan in a forward scanning direction and in a backward scanning direction along the main scanning direction to form dot images on the recording medium, an imaging unit imaging a dot image at a predetermined position on the recording medium, a detection unit detecting a positional shift amount of the dot images formed in a forward scanning of the recording head, a positional shift amount of the dot images formed in a backward scanning of the recording head, an inclination amount of the recording head in the forward scanning, and an inclination amount of the recording head in the backward scanning based on calibration image data obtained by imaging two first marks and two second marks in a single view by the imaging unit, the two first marks being dot images simultaneously formed on the recording medium while the recording head is moved in a forward direction by using different nozzles arranged in a same nozzle line in the main scanning direction, the center positions of the first marks being detectable, the two second marks being dot images simultaneously formed on the recording medium while the recording head is moved in a backward direction by using the same nozzles having been used to form the first marks and by setting an offset value corresponding to a predetermined distance from the first marks, the center positions of the second marks being detectable, and a correction unit correcting a drive of the recording head based on the positional shift amounts and the inclination amounts of the recording head detected by the detection unit.

According to an embodiment of the present invention, the positional shift amount of the dot images formed in a forward scanning of the recording head, the positional shift amount of the dot images formed in a backward scanning of the recording head, the inclination amount of the recording head in the forward scanning, and the inclination amount of the recording head in the backward scanning are obtained based on calibration image data obtained by imaging two first marks and two second marks in a single view by the imaging unit, the two first marks being a predetermined pattern formed while the recording head is moved in a forward direction, the two second marks being a predetermined pattern formed while the recording head is moved in a backward direction. Therefore, it may become possible to adequately control the recorded positional shift amounts.

BRIEF DESCRIPTION OF THE DRAWINGS

Other objects, features, and advantages of the present invention will become more apparent from the following description when read in conjunction with the accompanying drawings, in which:

FIG. 13A is a drawing showing a target dot image pattern to be formed on a sheet as a result of correction based on the calibration image data in FIG. 12;

FIG. 13B is a drawing showing how an appropriate nozzle to be used in the recording head is selected as a result of the correction based on the calibration image data in FIG. 12;

FIG. 16 is a top view showing a third example of the imaging unit of the image forming apparatus according to an embodiment of the present invention.

DETAILED DESCRIPTION OF THE PREFERRED EMBODIMENTS

In the following, a configuration of an image forming apparatus according to an embodiment of the present invention is described.

Figure 1:
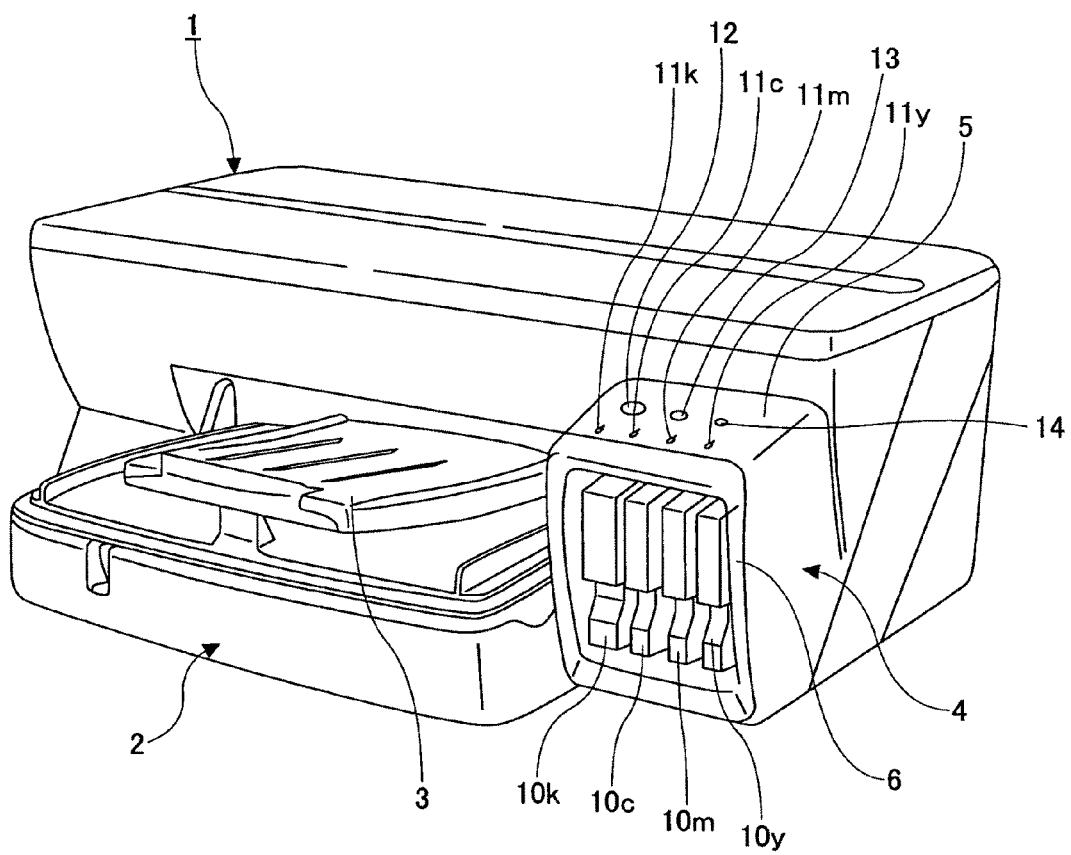
FIG. 1 is a front perspective view showing an inkjet recording apparatus as an image forming apparatus according to an embodiment of the present invention.

FIG. 1 is a front oblique view of an inkjet recording apparatus as an image forming apparatus according to an embodiment of the present invention.

As shown in FIG. 1, the inkjet recording apparatus includes an apparatus main body 1, a sheet tray 2 to be loaded into the apparatus main body 1 for stacking and providing sheets, and a discharge tray 3 detachably provided to the apparatus main body 1 for stacking discharged sheets on which images are recorded (formed). The inkjet recording apparatus further includes a cartridge loading section 4 protruding from the front of the apparatus main body 1 on one side (the side other than the side where the sheet tray 2 and the discharge tray 3 are provided) and an operations/display section 5 provided on the upper surface of the cartridge loading section 4 and providing operation buttons and a display unit.

In the cartridge loading section 4, for example, ink cartridges 10k, 10c, 10m, and 10y (may be collectively referred to as "ink cartridge 10" when colors are not required to be distinguished) can be inserted from the front side to the rear side, the ink cartridges 10k, 10c, 10m, and 10y being recording liquid ink cartridges (as recording liquid containing unit) containing black (Bk) ink, cyan (C) ink, magenta (M) ink, and yellow (Y) ink, respectively, as different color materials to form a colored image. Further, a front cover (cartridge cover) 6 is openably and closably provided on the front side of the cartridge loading section 4 so that the front cover 6 is open when the ink cartridge 10 is to be loaded into and removed from the cartridge loading section 4. Further, the ink cartridges 10k, 10c, 10m, and 10y are loaded so that the cartridges are vertically loaded (inserted) side by side as shown in FIG. 1.

Further, the operations/display section 5 includes ink-remaining-amount display sections 11k, 11c, 11m, and 11y (or collectively referred to as ink remaining amount display section 11 upon no color being required to be specified) which are to be turned ON when the respective ink remaining amounts become a low level or reach the end (empty) level. Further, a power switch 12, a sheet-feed/print-resume button 13, and a cancel button 14 are also provided on the operations/display section 5.

Figure 2:
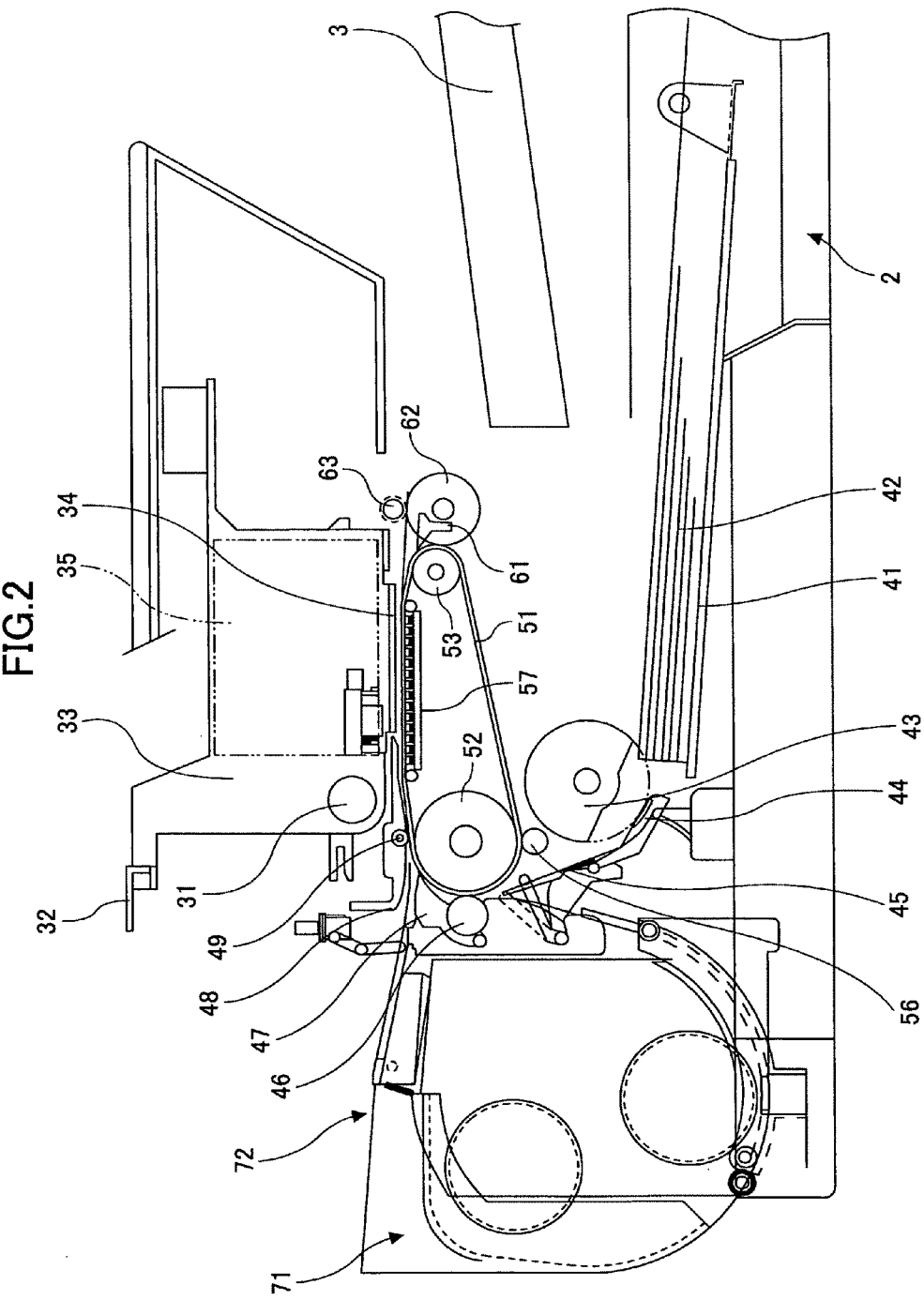
FIG. 2 is a cut-open view schematically illustrating a configuration of a mechanical section of the apparatus.
Figure 3:
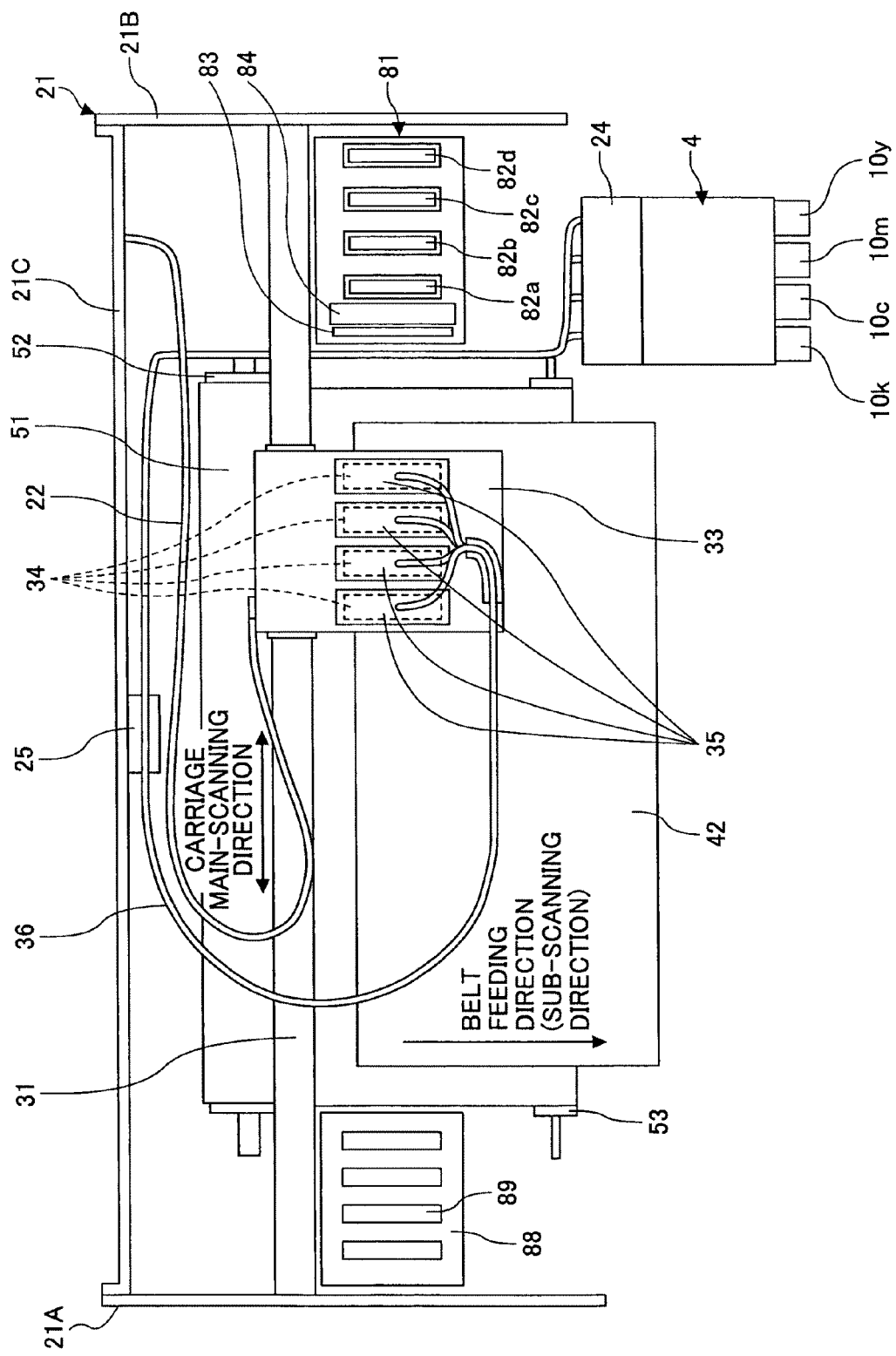
FIG. 3 is a top open view showing a main part of the mechanical section.

Next, a mechanical section of the inkjet recording apparatus is described with reference to FIGS. 2 and 3. FIG. 2 schematically illustrates a configuration of the mechanical section and FIG. 3 schematically shows a main part of the mechanical section. As shown in FIGS. 2 and 3, a carriage 33 is slidably provided so as to move in the main-scanning direction along a guide rod 31 and by a stay 32, the guide rod 31 being a guide member bridged between left and right side plates 21A and 21B constituting a frame 21, so that the carriage 33 can be moved (scanned) in the arrow direction of FIG. 3 (i.e., in the main-scanning direction of the carriage 33) through a timing belt driven by a main-scanning motor (not shown).

Further, the carriage 33 includes a recording head 34 having four (4) droplet ejection heads capable of ejecting ink of different colors yellow (Y), cyan (C), magenta (M), and black (Bk) as described above, so that the plural ink ejection ports (nozzles) of the recording head 34 are arranged in the direction crossing the main scanning direction, and the output direction of ink ejection is downward.

As the inkjet head that constitutes the recording head 34, a piezoelectric actuator such as a piezoelectric element, a thermal actuator using phase change caused by film boiling of liquid by using an electrothermal conversion element such as a heat resistor, a shape-memory alloy actuator using metallic phase change caused by thermal change, or an electrostatic actuator using an electrostatic force may be included in the inkjet head as a pressure actuator to generate pressure to eject the liquid droplets.

The recording head 34 includes a driver IC connected to a control section (not shown) by using a harness (flexible print cable) 22.

Further, the carriage 33 includes the recording head 34 and sub-tank 35 of each color ink to provide the corresponding color ink to the recording head 34. The sub-tank 35 of each color ink is connected to the corresponding ink cartridge 10 of the same color ink through a supply tube 36 so that the ink is supplied to the sub-tank 35 of each color from the ink cartridge 10 of the same color ink. Further, the cartridge loading section 4 includes a supply pump 24 for pumping the ink in the ink cartridge 10 to the sub-tank 35 and the supply tube 36 is fixed to a rear plate 21C using a holding member 25.

While the carriage 33 is being moved, the positional information of the carriage 33 is detected by reading a pattern recorded at the same interval on an encoder scale (not shown) fixed on the chassis of the apparatus, converted from the read pattern into an encoded signal, and output as the encoded signal.

On the other hand, in a sheet supply section for supplying a sheet 42 stacked on a sheet stacking section (a thick plate) 41 of the sheet tray 2, there are provided a half-moon roller (sheet feeding roller) 43 for separating sheets 42 one by one from the stacked sheets on the sheet stacking section 41 and a separation pad 44 facing the sheet feeding roller 43, made of a material having a high friction coefficient, and being pressed with respect to the sheet feeding roller 43.

Then, to feed the sheet 42 from the sheet supply section to the lower side of the recording head 34, there are provided a guide member 45 for guiding the sheet 42, a counter roller 46, a feed guide member 47, and a pressing member 48 having a top pressing roller 49. Further, there is provided a feed belt 51 (as a feeding unit) to electrostatically attract the supplied sheet 42 and feed the sheet 42 to the position facing the recording head 34.

The feed belt 51 is an endless belt extended between a feeding roller 52 and a tension roller 53 so as to rotate in the belt feeding direction (sub-scanning direction). Further, there is a charging roller 56 (as a charging unit) to charge the surface of the feed belt 51. The charging roller 56 is in contact with a surface layer of the feed belt 51 so as to rotate following the rotation of the feed belt 51. Further, on the rear (inner) side of the feed belt 51, a guide member 57 is disposed at the position corresponding to the printing area defined by the movement of the recording head 34.

The feed belt 51 is provided to be rotated in the belt feeding direction (sub-scanning direction) as shown in FIG. 3 and rotationally driven by the feeding roller 52 through a timing belt driven by a sub-scanning motor (not shown).

Further, as a sheet discharge section to discharge the sheet 42 on which an image is printed by the recording head 34, there are a separation hook 61, discharge sheet rollers 62 and 63, and the discharge tray 3 below the discharge sheet roller 62, the separation hook 61 being for separating the sheet 42 from the feed belt 51.

Further, a both-sides unit 71 is removably provided on the rear side of the apparatus main body 1. The both-sides unit 71 inverts the front and back faces of the sheet 42 returned by the reverse rotation of the feed belt 51 and supplies the inverted sheet 42 between the counter roller 46 and the feed belt 51 again. Further, a manual tray 72 is provided above the both-sides unit 71.

Further, as shown in FIG. 3, in a non-printing area on one side (the right-hand side in FIG. 3) of the scanning direction of the carriage 33 (i.e., in the main-scanning direction), there is provided a maintenance and recovery mechanism 81 (including a recovery unit) to maintain and recover the condition of the nozzles of the recording head 34.

The maintenance and recovery mechanism 81 includes cap members (hereinafter simplified as a cap) 82a through 82d (may be collectively referred to as a cap 82 upon no cap being required to be specified) to cap the nozzle surfaces of the recording head 34, a wiper blade 83 which is a blade member to wipe the nozzle surfaces, a flushing receiver 84 to receive droplets in a flushing operation in which droplets not contributing to recording images are ejected to eject recording liquid having high viscosity. Herein, the cap 82a is for absorption and moisture retention, and the caps 82b through 82d are for moisture retention.

Further, as shown in FIG. 3, in a non-printing area on the other side of the scanning direction of the carriage 33 (i.e., on the left-hand side of FIG. 3), there is provided a flushing receiver 88 to receive droplets in the flushing operation in which droplets not contributing to recording images are ejected to eject recording liquid thickened during recording or the like and opening sections 89 having openings arranged along the nozzle lines of the recording head 34.

In the inkjet recording apparatus configured as described above, sheets 42 on the sheet tray 2 are separated one by one, fed in substantially the vertically upward direction to be guided by the guide member 45, and fed through between the feed belt 51 and the counter roller 46; the header portion of the sheet 42 is guided by the feed guide member 47 and pressed downward onto the feed belt 51 by the top pressing roller 49 to change the feeding direction of the sheet 42 by approximately 90 degrees.

At that time, a voltage alternately changing between a plus (positive) output and a minus (negative) output (i.e., AC voltage) is applied to the charging roller 56, so that an alternating charged pattern is formed on the feed belt 51. In other words, a plus voltage area and a minus voltage area each having a predetermined belt-like width (length) in the sub-scanning direction which is the rotating direction are alternately charged on the feed belt 51. As a result, when the sheet 42 is fed on the charged feed belt 51, the sheet 42 is attracted to the feed belt 51 and therefore, the sheet 42 is fed in the sub-scanning direction in accordance with the rotational movement of the feed belt 51.

When a dot image (herein may be simplified as an image) is formed, while obtaining the positional information of the carriage 33 by an encoder sensor, the carriage 33 is moved (scans) in the main-scanning direction by a scanning mechanisms described below, and at a necessary position of the carriage 33, ink droplets are ejected onto the sheet 42 held on the feed belt 51. At that time, a dot image having the band width (in the sub-scanning direction) the same as the length (in the sub-scanning direction) of the nozzle lines can be formed by ejecting ink droplets once while moving the carriage 33 in the main-scanning direction. Then after the image formed of one band width is completed, the sheet 42 is fed in the sub-scanning direction by driving the sub-scanning motor (not shown), so that an image forming operation for the next band width is repeated to form an image on an arbitrary portion of the sheet 42. The recording operation is stopped upon receiving a record end signal or a signal indicating that the posterior end the sheet 42 has reached the recording area, and the sheet 42 is discharged to the discharge tray 3.

Further, while waiting for printing (recording), the carriage 33 is moved to the maintenance and recovery mechanism 81 side so that the recording head 34 is capped by the cap 82 to keep the nozzles in moist condition to prevent an ejection error caused by dried ink. Further, while the cap 82 caps the recording head 34, the recording liquid is suctioned from the nozzles of the recording head 34 by using an absorption pump (not shown) (this suction may be called "nozzle suction" or "head suction") so that the recording liquid having high viscosity and air bubbles can be discharged to perform a recovery operation. Further, before and during the recording and the like, a flushing operation is performed so that the ink liquid is to be ejected irrespective of whether the printing data ink is ejected. By doing this operation, it becomes possible to maintain the stable ejection performance of the recording head.

Figure 4:
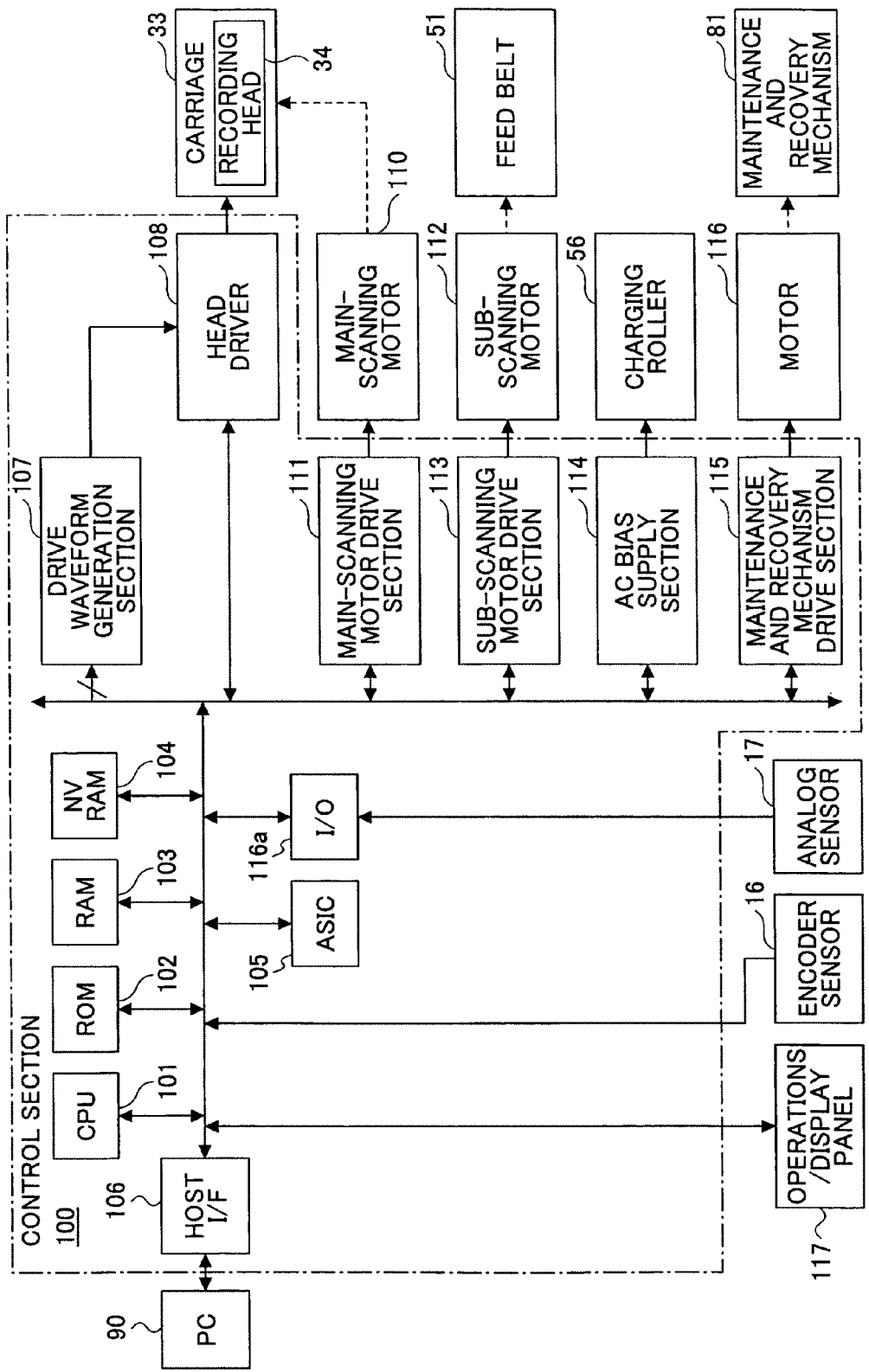
FIG. 4 is the block diagram showing an exemplary control section of the image forming apparatus according to an embodiment of the present invention.

Next, the control section of the inkjet recording apparatus shown in FIGS. 1 through 3 is briefly described with reference to FIG. 4. FIG. 4 is an exemplary block diagram of the control section. As shown in FIG. 4, the control section 100 includes a CPU 101, a ROM 102, a RAM 103, a non-volatile memory (NVRAM) 104, and an ASIC 105. The CPU 101 controls the entire apparatus including the feeding of the sheet 42 and the movement of the recording head 34 and performs arithmetic processing. The ROM 102 stores a program to be executed by the CPU 101 and fixed data such as the data of test patterns including a first mark and a second mark (described below). The RAM 103 serves as a working area for the arithmetic processing and a buffer temporarily storing the image data and the like. The non-volatile memory (NVRAM) 104 retains data of machine information (version data, a characteristic value specific to the machine and the like) even when the power to the apparatus is turned OFF. The ASIC 105 performs signal processing, image processing including rearrangement, and processing of input and output signals for controlling the rest of the apparatus (e.g., mechanical control, memory control, interface control with the CPU 101).

The control section 100 further includes a host I/F 106, a drive waveform generation section 107, a head driver 108, a main-scanning motor drive section 111, a sub-scanning motor drive section 113, an AC bias supply section 114, a maintenance and recovery mechanism drive section 115, an ADC (Analog-to-Digital Converter) 116a, and a sub-scanning encoder sensor (not shown). The host I/F 106 receives a printing job from a host PC 90 serving as a data processing apparatus such as a personal computer with installed printer driver. The drive waveform generation section 107 generates a drive waveform to drive the recording head 34. The head driver 108 receives the drive waveform from the drive waveform generation section 107 and controls to drive pressure actuators (not shown) of the recording head 34. The main-scanning motor drive section 111 drives a main-scanning motor 110 to cause the carriage 33 to scan. The sub-scanning motor drive section 113 drives a sub-scanning motor 112 to rotate the feed belt 51 to feed the sheets 42. The AC bias supply section 114 supplies an AC bias to the charging roller 56 for charging the feed belt 51. The maintenance and recovery mechanism drive section 115 drives a motor 116 to perform a maintenance process for the recording head 34 in the maintenance and recovery mechanism 81 of the apparatus. The ADC (Analog-to-Digital Converter) 116a converts the output signals from an encoder sensor 16 and an analog sensor 17 into digital values to obtain the moving speed of the carriage 33 in the main-scanning direction and the positional information of the carriage 33. The sub-scanning encoder sensor (not shown) obtains the rotational speed and the positional information of the feed belt 51 in the sub-scanning direction. Further, the control section 100 is connected to an operations/display panel 117 on which necessary data can be input and displayed.

The control section 100 receives a printing job from the host I/F 106 through a cable or a network, the printing job including image data and the like transmitted from the host PC. 90 such as a data processing apparatus like a personal computer, an image reading apparatus like an image scanner, or an imaging apparatus like a digital camera. Next, the CPU 101 reads and analyzes the print data in a receive buffer in the host I/F 106, and a rearrangement process and the like are performed on the print data. Next, the print data are fed to the drive waveform generation section 107, so that the drive waveform generation section 107 outputs image data and a drive waveform to the head driver 108 at a predetermined timing (determined by, for example, by an encoder timing signal based on an encoder signal from the encoder sensor 16). In this case, for example, the generation of dot pattern data to be used for outputting an image may be based on the font data stored in the ROM 102 or based on the bit map data that are converted from image data by the printer driver installed in the host PC 90, and fed to the apparatus.

The drive waveform generation section 107 includes a D/A converter, an amplifier and the like, the D/A converter performing a digital-to-analog conversion on the pattern data of the drive pulse, the pattern data being stored in the ROM 102 and read by the CPU 101. Then, the drive waveform generation section 107 outputs a drive waveform including one or more driving pulses to the head driver 108.

The head driver 108 controls the ejection timing of the ink from the recording head 34 by selectively applying drive pulses to the pressure actuators of the recording head 34, the drive pulses constituting a drive waveform given by the drive waveform generation section 107 based on serial input image data (dot pattern data) corresponding to one line of the recording head 34. The head driver 108 may include a shift register inputting a clock signal and serial data of image data, a latch circuit latching a registered value of the shift register by a latch signal, a level conversion circuit (level shifter) changing the level of the output value of the latch circuit, an analog switch array (switching unit) to be ON/OFF controlled by the level shifter and the like, so that the head driver 108 drives the recording head 34 by selectively applying desired drive pulses included in the drive waveform to the recording head 34 by performing the ON/OFF control of the analog switch array.

The technique described above is the same as that employed in a conventional inkjet recording apparatus.

In a conventional inkjet recording apparatus, however, when bi-directional (i.e., forward and backward directions) printing in the main scanning direction is performed, a problem is likely to occur in that the recording positions in forward scanning and the recording positions in backward scanning are shifted relative to each other due to the difference between the inclination amounts (angle) of the recording head 34 mounted on the carriage 33 when the recording head 34 moves in the forward direction and the inclination amounts (angle) of the recording head 34 mounted on the carriage 33 when the recording head 34 moves in the backward direction.

Figure 5:
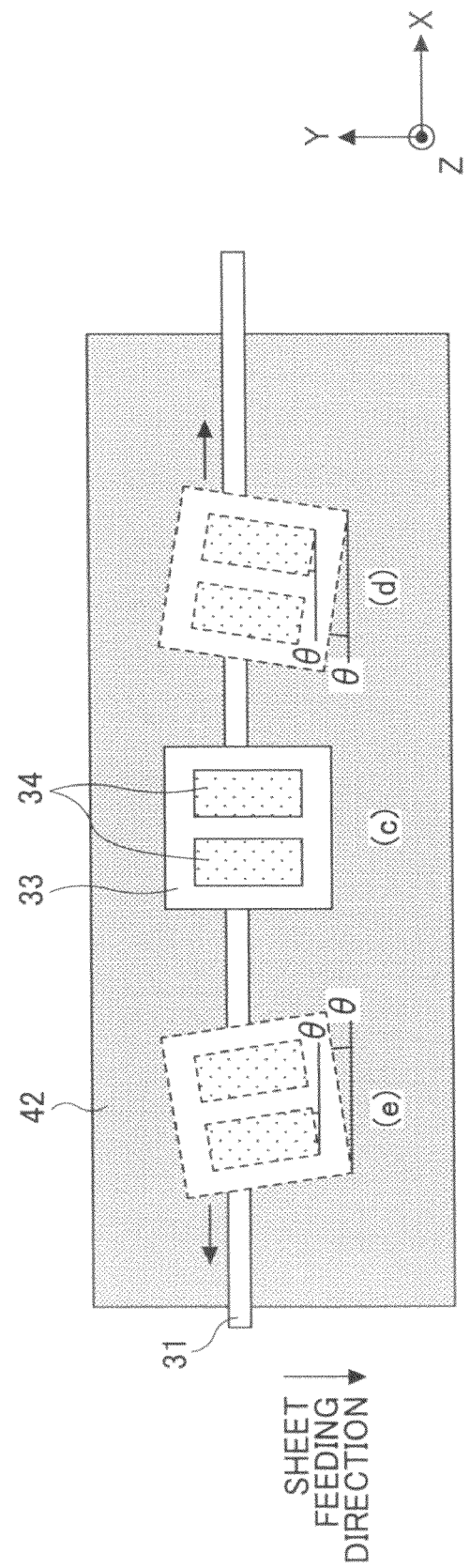
FIG. 5 is a top view schematically showing the inclination of a carriage when the carriage is scanned along the main-scanning direction.
Figure 6:
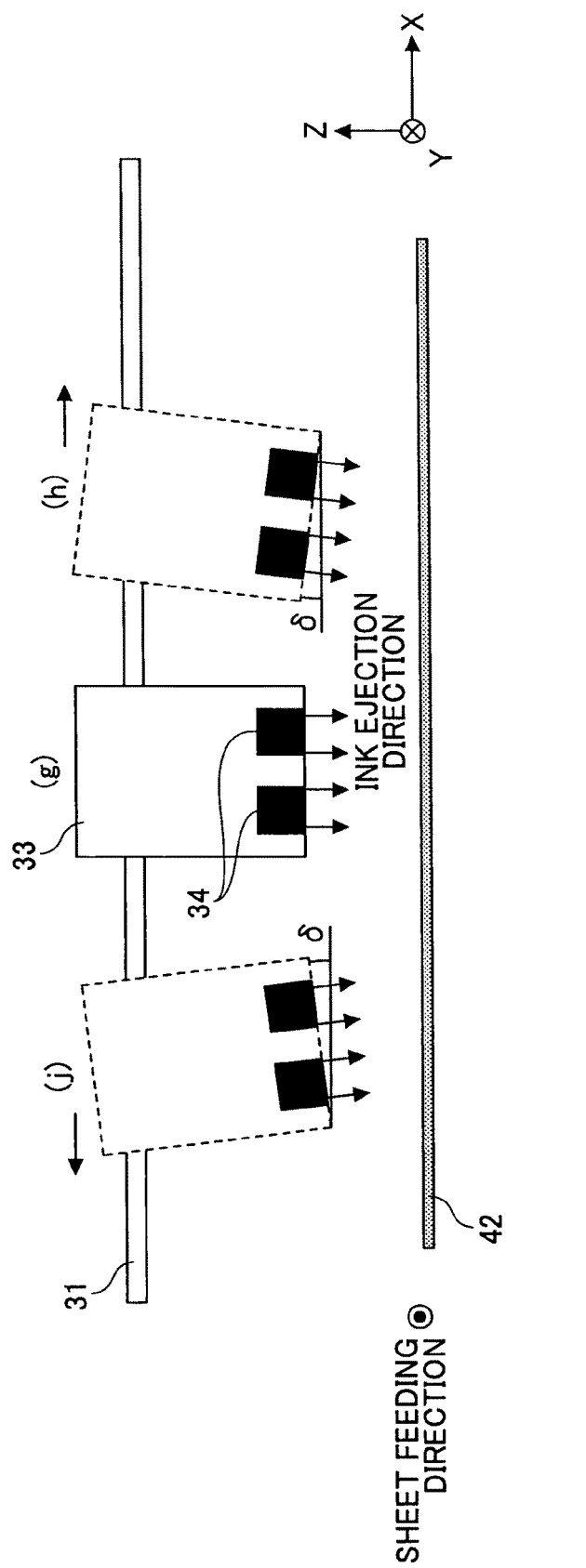
FIG. 6 is a front view schematically showing the inclination of the carriage when the carriage is scanned in the main-scanning direction.

The inclination amount (angle) of the recording head 34 is described with reference to FIGS. 5 and 6. In FIGS. 5 and 6, for explanation purposes, the number of the recording heads provided on the carriage 33 is two. However, actually, as many as the recording heads 34 corresponding to colors such as black, cyan, magenta, yellow may be mounted. Further, on the surface of the recording head 34, there are plural nozzles for ejecting ink arranged both in the feeding direction of a recording medium (sheet 42) (i.e., the sub-scanning direction) and in the direction orthogonal to the feeding direction (i.e., the main-scanning direction).

FIG. 5 is a top view showing the driving status of the carriage 33.

As shown in FIG. 5, when the carriage 33 is stopped (as shown in the position (c)), an image can be printed on the recording medium 42 under the condition that the recording head 34 is not inclined in any of the main-scanning direction X and the sub-scanning direction Y. On the other hand, when the carriage 33 is moved (as shown in the positions (d) and (e)), the recording head 34 is inclined in the main-scanning direction X and the sub-scanning direction Y. Herein, the inclination angle of the recording head 24 (namely, a rotation angle of recording head 24 in the X-Y plane) is defined as "θ".

FIG. 6 is a front view showing the driving status of the carriage 33.

As shown in FIG. 6, when the carriage 33 is stopped (as shown in the position (g)), the recording head 34 is not inclined in the main-scanning direction X and the vertical direction Z with respect to the recording medium 42 plane; the ink ejection direction is parallel to the vertical direction Z. On the other hand, when the carriage 33 is moved (as shown in the positions (j) and (h)), the recording head 34 is inclined with respect to the vertical direction Z, namely, the ink ejection direction is inclined with respect to the vertical direction Z (in the X-Z plane), and as a result, the ink landing positions are shifted (displaced) in the main-scanning direction. Herein, the inclination angle of the recording head 24 (namely, a rotation angle of recording head 24 in the X-Z plane) is defined as "δ".

As described above, the recording head 34 is inclined when the carriage 33 moves (scans) in the main-scanning direction, but the inclination amounts (angles) "θ" and "δ" may differ between the forward scanning and the backward scanning, which results in the problem that printing positions are shifted when the bi-directional printing (including printing in forward and backward directions) is performed.

The present invention may resolve the above problem. According to an embodiment of the present invention, an image forming apparatus includes a recording head (recording head 34) having a plurality of nozzles each ejecting ink onto a recording medium, the nozzles constituting nozzle lines arranged in a sub-scanning direction parallel to a feeding direction of the recording medium and in a main-scanning direction orthogonal to the feeding direction, the recording head scanning in a forward scanning direction and in a backward scanning direction along the main scanning direction to form dot images on the recording medium; an imaging unit (two-dimensional imaging apparatus 37) imaging a dot image at a predetermined position on the recording medium; a detection unit (CPU 101) detecting a positional shift amount of the dot images formed in a forward scanning of the recording head, a positional shift amount of the dot images formed in a backward scanning of the recording head, an inclination amount of the recording head in the forward scanning, and an inclination amount of the recording head in the backward scanning based on calibration image data obtained by imaging two first marks and two second marks in a single view by the imaging unit, the two first marks being dot images simultaneously formed on the recording medium while the recording head is moved in a forward direction by using different nozzles arranged in a same nozzle line in the main scanning direction, the center positions of the first marks being detectable, the two second marks being dot images simultaneously formed on the recording medium while the recording head is moved in a backward direction by using the same nozzles having been used to form the first marks and by setting an offset value corresponding to a predetermined distance from the first marks, the center positions of the second marks being detectable; and a correction unit (CPU 101) correcting a drive of the recording head based on the positional shift amounts and the inclination amounts of the recording head detected by the detection unit.

Figure 7:
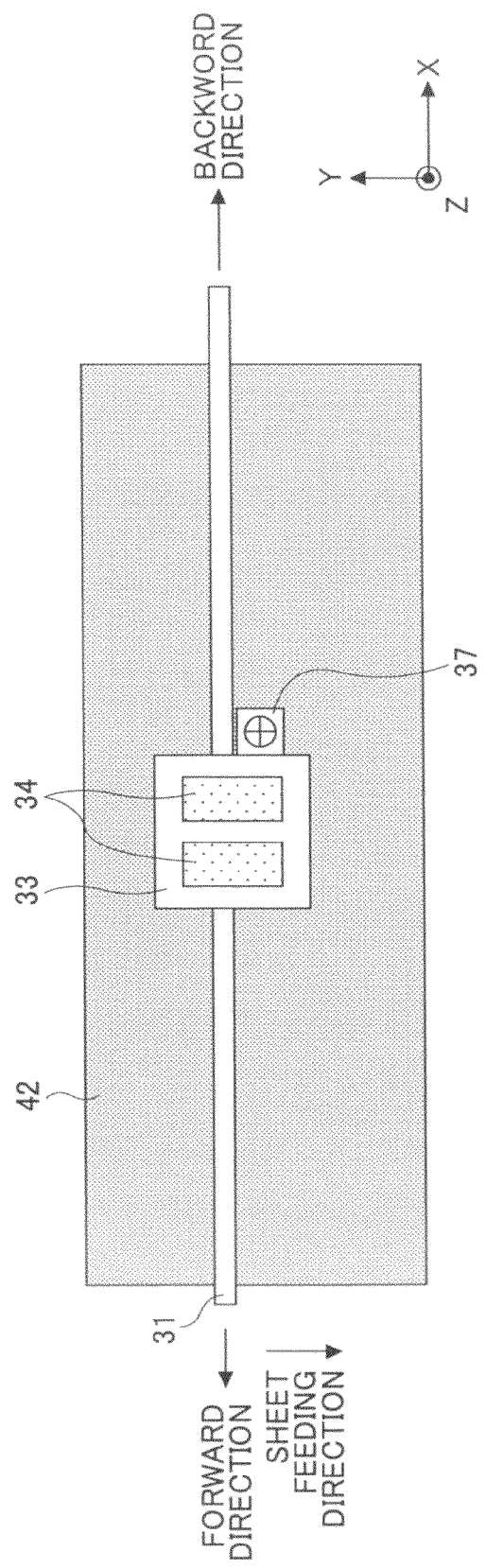
FIG. 7 is a top view showing a first example of an imaging unit of the image forming apparatus according to an embodiment of the present invention.

FIG. 7 shows a first example of an imaging unit. FIG. 7 is a top view showing a main-scanning printing area in which the main-scanning direction corresponds to the X axis and the sub-scanning direction corresponds to the Y axis.

The carriage 33 is scanned (driven) forward and backward in the main-scanning direction X along the guide rod (sliding axle) 31, and the recording head 34 in the carriage 33 follows the forward and backward movement (scanning) of the carriage 33 and ejects ink at a predetermined position on the recording medium 42 to perform an image forming process. On one side of the carriage 33, a two-dimensional imaging apparatus (hereinafter may be simplified as an imaging apparatus) 37 as an imaging unit is mounted, so that the imaging apparatus 37 can move in the main-scanning direction following the scanning movement of the carriage 33. Further, in the two-dimensional imaging apparatus 37, there are provided reference coordinates X and Y which are in parallel to the main-scanning direction X and the sub-scanning direction Y, respectively.

Herein, the two-dimensional imaging apparatus 37 is a device such as a two-dimensional image sensor capable of imaging an image (dot image) formed on a predetermined area of the recording medium 42 in a single view, namely as single image data. Further, the two-dimensional imaging apparatus 37 may be a scanner capable of imaging an image of the recording medium 42 by scanning (moving) a line sensor along the main-scanning direction.

Figure 8:
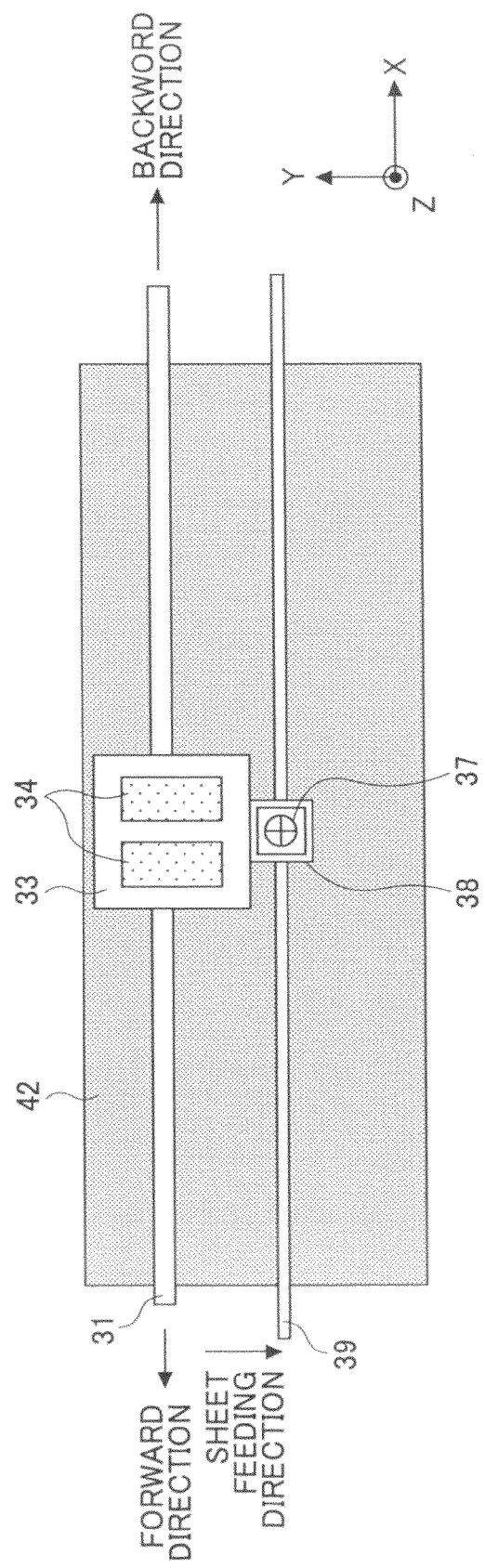
FIG. 8 is a top view showing a second example of the imaging unit of the image forming apparatus according to an embodiment of the present invention.

FIG. 8 shows a second example of an imaging unit. FIG. 8 is a top view showing the main-scanning printing area in which the main-scanning direction corresponds to the X axis and the sub-scanning direction corresponds to the Y axis.

In this example, the two-dimensional imaging apparatus 37 is mounted on an imaging apparatus carriage 38 which is another carriage different from the carriage 33 and is provided so as to be moved in the main-scanning direction along a dedicated guide rod (sliding axle) 39.

Next, first marks and second marks are described that are to be formed on the sheet 42 to obtain the calibration image data.

Figure 9:
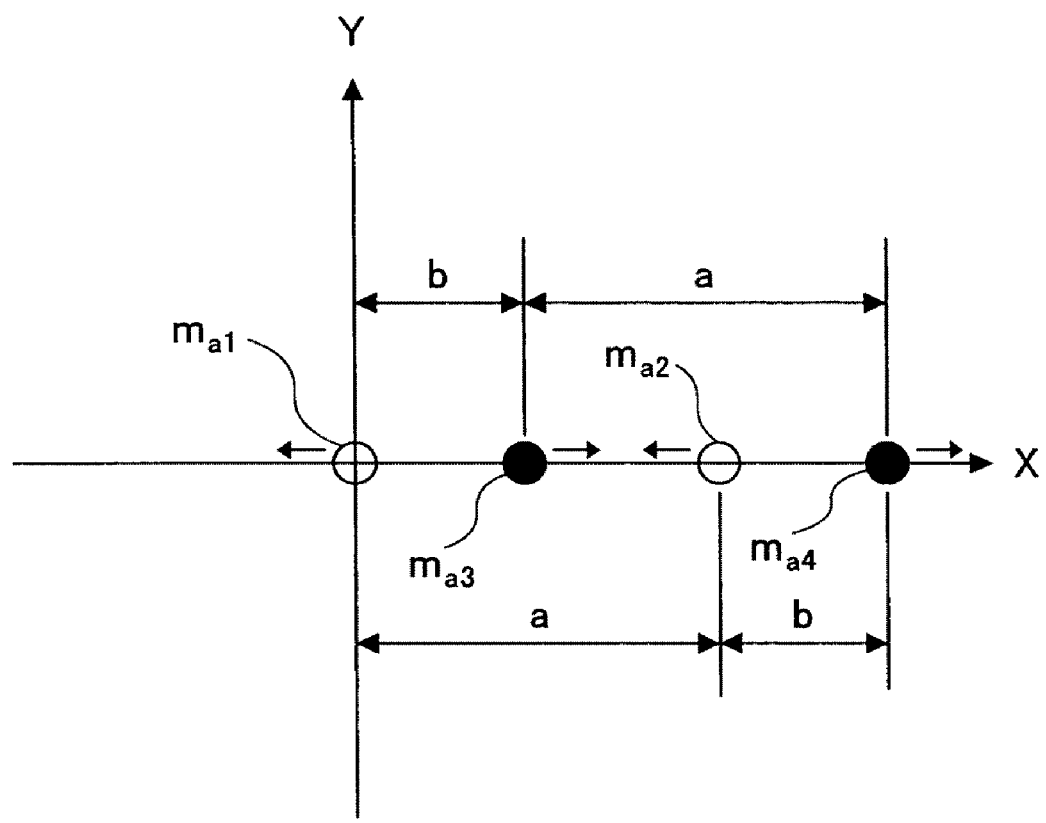
FIG. 9 is a drawing showing a test pattern formed in an ideal condition without any positional shift in recorded dot images.

FIG. 9 shows the first marks and the second marks (a first test pattern and a second test pattern, respectively) that are dot images recorded on the sheet 42. Further, FIG. 9 shows a case where the first marks and the second marks are in the ideal condition in which it is not necessary to correct any positional shift amounts because no positional shift amounts are generated. In other words, the test patterns recorded in FIG. 9 can be regarded as target image data set in the CPU 101. In FIG. 9, the X axis and the Y axis correspond to the reference coordinates X and Y, respectively, having been set in the imaging apparatus 37 when the first marks and/or the second marks are imaged by the imaging apparatus 37. This also applies to the other drawings including such X-Y coordinates.

The first marks $m_{a1}$ and $m_{a2}$ are dot images simultaneously formed on the recording medium 42 by using different nozzles of the recording head 34 while the recording head 34 is moved in the forward direction (directed to the left-hand side along the X axis), the different nozzles being disposed in the same nozzle line but separated from each other in the main-scanning direction. Further, each center position of the two first marks is detectable. The first marks $m_{a1}$ and $m_{a2}$ constitute the first test pattern. In the present embodiment, the number of the first marks constituting the first pattern is not necessarily limited to two (2). Three (3) or more first marks may be used as long as those marks are simultaneously formed by using different nozzles of the same recording head 34, the different nozzles being disposed in the same nozzle line but separated from each other in the main-scanning direction, and the center positions of the dot images of the marks can be detected.

Further, the second marks $m_{a3}$ and $m_{a4}$ are dot images simultaneously formed on the recording medium 42 by using the same nozzles that have been used for recording the first marks $m_{a1}$ and $m_{a2}$ while the recording head 34 is moved in the backward direction (directed to the right-hand side along the X axis) and by setting an offset amount from each of the first marks $m_{a1}$ and $m_{a2}$, the offset amount indicating a predetermined distance between the first mark and the corresponding second mark along the main-scanning direction. Further, the center positions of the two second marks are detectable. The second marks $m_{a3}$ and $m_{a4}$ constitute the second test pattern. Namely, the second marks constituting the second test pattern are formed so as to correspond to the first marks.

In FIG. 9, a printing interval between the first marks $m_{a1}$ and $m_{a2}$ and between the second marks $m_{a3}$ and $m_{a4}$ is given as "a", and the offset amount between the first mark $m_{a1}$ and the second mark $m_{a3}$ and between the first mark $m_{a2}$ and the second mark $m_{a4}$ in the main-scanning direction is given as "b". The nozzles used for recording the first marks $m_{a1}$ and $m_{a2}$ (and the second marks $m_{a3}$ and $m_{a4}$ as well) are disposed in the same positions in the sub-scanning direction. Further, an offset amount between the first marks $m_{a1}$ and $m_{a2}$ and between the second marks $m_{a3}$ and $m_{a4}$ in the sub-scanning direction is zero (0). In this case, it is preferable that the nozzles be used that are located in the center part of the same nozzle line in the sub-scanning direction.

In this case, each of first and second marks $m_{a1}$, $m_{a2}$, $m_{a3}$, and $m_{a4}$ is formed as a single dot or a dot aggregate by using a single or plural nozzles, respectively, of the recording head 34. The size of the dot or the dot aggregate is not limited as long as the center position of the formed image (dot or the dot aggregate) can be detected by imaging the formed image by using the imaging apparatus 37 and performing image processing. Further, the shape of the marks is not limited as long as the center position of the marks can be detected. Such shapes may be, for example, a circular, rectangular, and cross (two lines are crossed) shape and the like. Further, the color of the marks is not limited as long as the pattern can be recognized from within the imaged image data.

Figure 10:
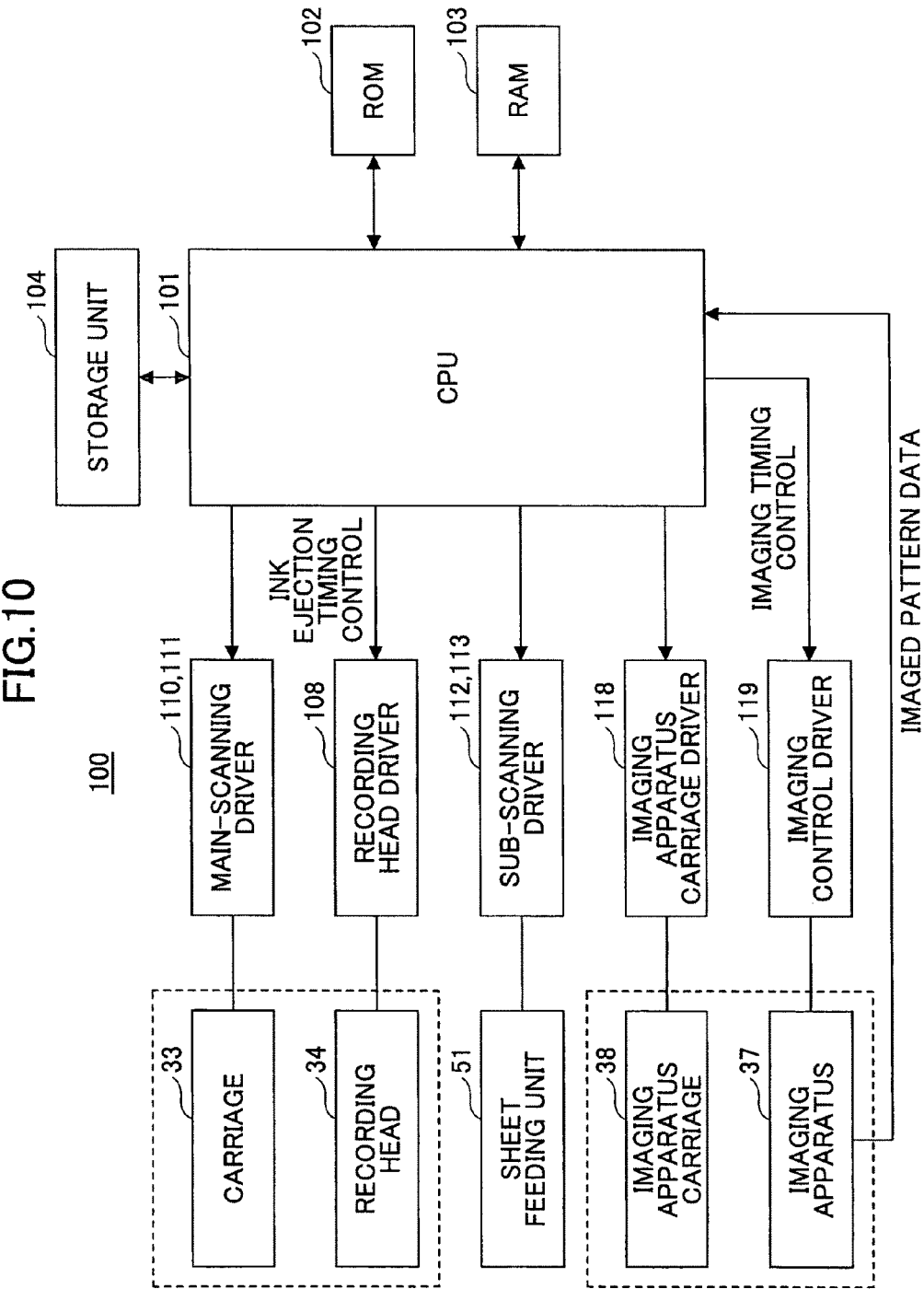
FIG. 10 is a block diagram showing a main part of a control section of the image forming apparatus according to an embodiment of the present invention.

FIG. 10 schematically shows a block diagram of the control section 100 of an image forming apparatus according to an embodiment of the present invention. This block diagram includes elements directly related to the present embodiment based on the configuration of FIG. 4. However, as shown in FIG. 10, there are additionally provided an imaging apparatus carriage driver 118 to move the imaging apparatus carriage 38 along the guide rod 39 and an imaging apparatus driver 119 to control the imaging timing of the imaging apparatus 37; the imaging apparatus carriage driver 118 and the imaging apparatus driver 119 are capable of being controlled by the CPU 101.

Figure 11:
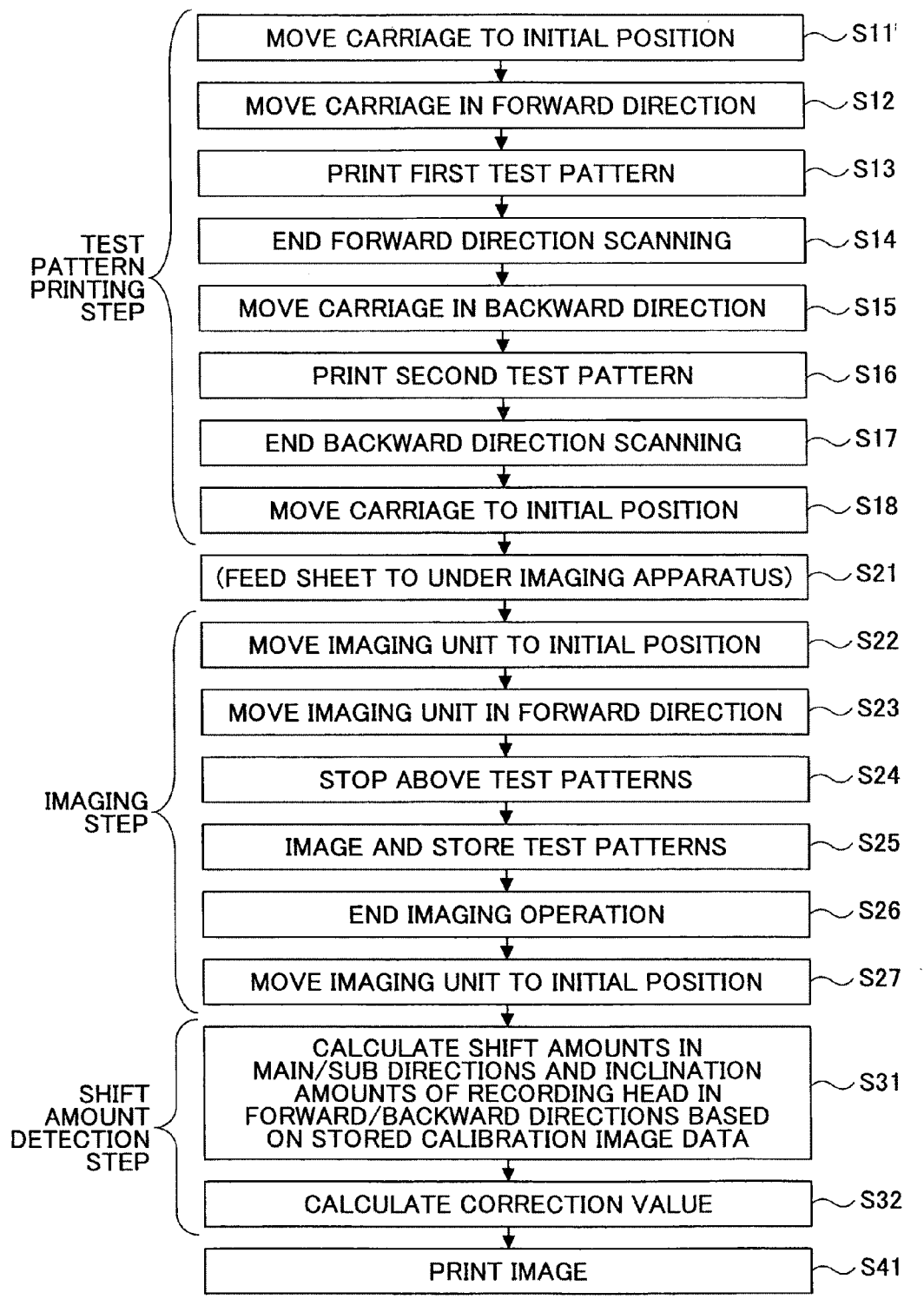
FIG. 11 is a first flowchart showing a process of correcting the shift of recorded dot positions in an image forming apparatus according to an embodiment of the present invention.

FIG. 11 is a flowchart showing a process of correcting the recorded position shift amount of an image forming apparatus according to an embodiment of the present invention. In the following, the process is described with reference to FIGS. 9 and 10.

Test Pattern Printing Step

In step S11, the CPU 101 controls the main-scanning motor drive section 111 to drive the main-scanning motor 110 to move the carriage 33 to its initial position (start position of the forward scanning). At that time, the sheet 42 is fed to the position so that an image can be formed on the sheet 42.

In step S12, while the carriage 33 is moved in the forward direction (directed to the left-hand side along the X axis), ink is ejected from the recording head 42 at a predetermined position based on the ejection timing control by the head driver 108. At that time, the ejection timing is controlled by a driving waveform generated based on the data stored in the ROM 102. As a result, in step S13, the first marks $m_{a1}$ and $m_{a2}$ as the first test pattern are printed. In step S14, the carriage 33 is moved to a predetermined position to end the scanning in the forward direction.

In step S15, while the carriage 33 is moved in the backward direction (directed to the right-hand side along the X axis), ink is ejected from the recording head 42 at a predetermined position (which is shifted by the offset amount "b" from the first marks $m_{a1}$ and $m_{a2}$ along the main-scanning direction) based on the ejection timing control by the head driver 108. At that time, the ejection timing is controlled by a driving waveform generated based on the data stored in the ROM 102. As a result, in step S16, the second marks $m_{a3}$ and $m_{a4}$ as the second test pattern are printed. In step S17, the carriage 33 is moved to a predetermined position to end the scanning in the backward direction. In step S18, finally, the carriage 33 is moved to the initial position to end the test pattern printing step.

Imaging Step

In step S21, the sheet 42 on which the first marks $m_{a1}$ and $m_{a2}$ and the second marks $m_{a3}$ and $m_{a4}$ are formed is moved in the sub-scanning direction to the position where the formed marks $m_{a1}$, $m_{a2}$, $m_{a3}$, and $m_{a4}$ can be collectively imaged by the imaging apparatus 37 (Namely, the position where the first marks $m_{a1}$ and $m_{a2}$ and the second marks $m_{a3}$ and $m_{a4}$ in the sub-scanning direction are disposed under the imaging apparatus 37) by the feed belt 51 by controlling the sub-scanning motor drive section 113 that drives the sub-scanning motor 112 which is a sub-scanning driver.

In step S22, the imaging apparatus 37 is moved to its initial position (for example, the initial position of the forward scanning in the main-scanning direction) by moving the imaging apparatus carriage 38 in the main-scanning direction by the control of the imaging apparatus carriage driver 118.

In step S23, the imaging apparatus carriage 38 is moved in the backward direction along the main-scanning direction.

In step S24, the imaging apparatus carriage 38 is stopped at a position where the imaging apparatus 37 is right above the first marks $m_{a1}$ and $m_{a2}$ and the second marks $m_{a3}$ and $m_{a4}$. The reason why the imaging apparatus 37 is stopped when the patterns are imaged is to prevent (reduce) the image blur that may be formed in the imaged calibration image data (pattern data). Other reasons are to prevent the inclination of the imaging apparatus 37 caused by its movement of the imaging unit and to prevent the inclination of the reference coordinates X and Y in the imaging apparatus 37.

In step S25, the imaging apparatus 37 in stop status images the dot images formed on the sheet 42 by the control of the imaging apparatus driver 119. At that time, the first marks $m_{a1}$ and $m_{a2}$ and the second marks $m_{a3}$ and $m_{a4}$ are simultaneously imaged and obtained as the calibration image data. By the control of the CPU 101, the calibration image data are stored in the NVRAM 104 serving as a storage unit. When above steps are performed, the imaging step is ended in step S26. Then, in step S27, the imaging apparatus carriage 38 is moved in the main-scanning direction, so that the imaging apparatus 37 is moved to the initial position.

Shift Amount Detection Step

In step S31, based on the calibration image data stored in the NVRAM 104, by using a print shift amount and inclination amount detection program, the positional shift amount of the dot images printed in the forward scanning of the recording head 34, the positional shift amount of the dot images printed in the backward scanning of the recording head 34 (i.e., the shift amounts of the recorded positions in each of the main scanning direction and the sub-scanning direction), and the inclination amounts (angles) of the recording head 34 in the forward scanning and the backward scanning are calculated (the detail is described below).

In step S32, based on the calculation result in step S31, a correction value is calculated to correct the drive of the recording head 34. Herein, to correct the drive of the recording head 34 refers to correcting the positions of the nozzles to be driven of the nozzle lines of the recording head 34 and/or correct the ink ejection timings from the nozzles.

Image Forming Step

In step S41, the correction value calculated in step S32 is reflected for the drive of the recording head 34 and the image is formed based on the input image data. By doing this, it may become possible to correct the shift amount between the printing positions in the forward scanning and the printing positions in the backward scanning, thereby enabling preventing the degradation of image quality. By further correcting the inclination amount (angle) of the recording head 34 (carriage 33) in the forward scanning and the backward scanning, it may become possible to perform more accurate correction between the printing positions in the forward scanning and the printing positions in the backward scanning.

The above successive steps may be performed at any timing such as when the power to the image forming apparatus is turned ON, when the image forming apparatus is installed, when maintenance is performed on the image forming apparatus, and when a predetermined number of sheets have been printed and the like.

Next, the positional shift amounts between the dot images printed in the forward scanning of the recording head 34 and the dot images printed in the backward scanning of the recording head 34 (i.e., the shift amounts of the recorded positions in the main scanning direction and in the sub-scanning direction) and the inclination amounts of the recording head 34 in the forward scanning and in the backward scanning are described.

Figure 12:
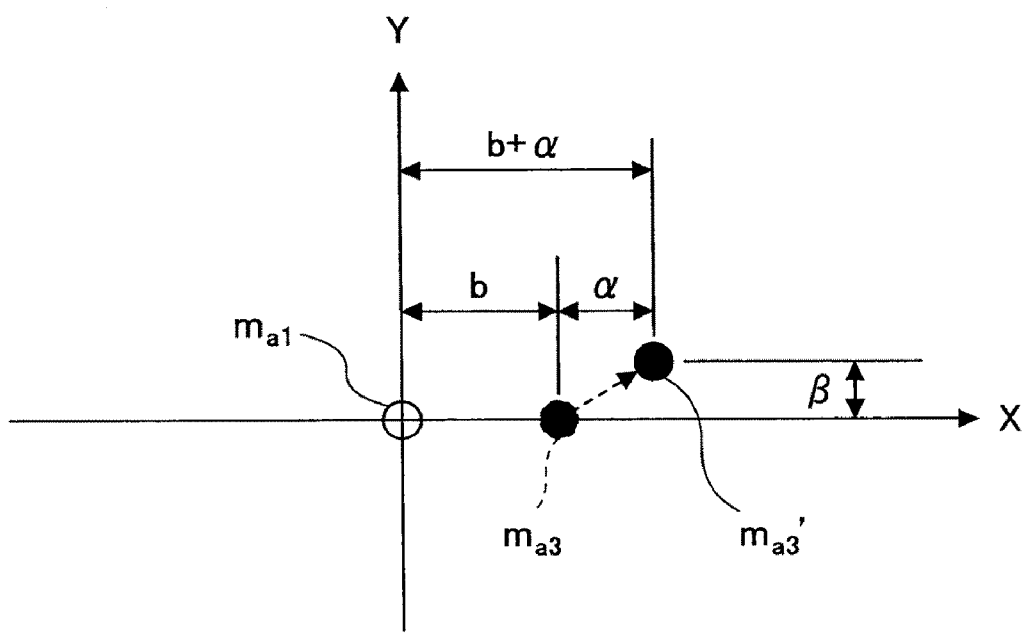
FIG. 12 is a drawing showing an example of calibration image data of first and second test patterns in which a shift of recorded dot images is observed, the test patterns being imaged by the imaging unit of the image forming apparatus according to an embodiment of the present invention.

FIG. 12 shows an example of the calibration image data of first and second test patterns in which the shift of recorded dot position occurs between the forward scanning and the backward scanning, the test patterns being imaged by the imaging unit. FIG. 12 shows a case where the shift amounts in the main-scanning and the in the sub-scanning direction are generated but the inclination amount of the recording head 34 is not generated. In this case of FIG. 12, a combination of the first mark $m_{a1}$ and the second mark $m_{a3}$ is focused on. However, other marks may be used (focused on) as long as the marks are printed in forward and backward scannings by using the same nozzle of the recording head 34. Therefore, for example, the combination of the first mark $m_{a2}$ and the second mark $m_{a4}$ may also be used.

In FIG. 12, under an ideal condition where no recorded positional shift occurs, the second mark $m_{a3}$ should have been printed so as to be separated from the first mark $m_{a1}$ by a distance (offset amount) "b" in the main-scanning direction and a distance (offset amount) "0" in the sub-scanning direction (see the position of the mark $m_{a3}$ in FIG. 12). However, actually, as shown in FIG. 12, the second mark $m_{a3}$ is printed so as to be separated from the first mark $m_{a1}$ by a distance (offset amount) "b+α" in the main-scanning direction (along the X axis) and a distance (offset amount) "β" in the sub-scanning direction (along the Y axis) (see the position of the mark $m_{a3}$' in FIG. 12). Therefore, in this case, it is possible to detect the values of "α" and "β" as the recorded positional shift amounts in the main-scanning direction and the sub-scanning direction, respectively. Herein, the positions of the first mark and the second mark refer to the center positions of the corresponding dot images.

As described above, the CPU 101 calculates the correction value to correct the drive of the recording head 34 based on the detected recorded positional shift amounts (I.e. "α" in the main-scanning direction and "β" in the sub-scanning direction). Next, the positional shift correction process (in step S32) is described with reference to FIGS. 13A and 13B.

In FIGS. 13A and 13B, it is assumed that the recording head 34 (carriage 33) is not inclined, unlike the case of FIG. 5 where the recording head 34 is incline by "θ". FIG. 13A shows an image pattern to be printed on the sheet 42 as a result of the correction to be performed. FIG. 13B shows a concept of the correction from the viewpoint of nozzle selection on the recording head 34.

As shown in FIG. 13A, there are positional shift amounts generated between the first mark $m_{a1}$ and the second mark $m_{a3}$' by a distance "α" in the main-scanning direction and a distance "β" in the sub-scanning direction. Therefore, as shown in FIG. 13A, it is necessary to shift the first mark $m_{a1}$ by "+α" in the main scanning direction and by "+β" in the sub-scanning direction so as to move to the position of the first mark $m_{a1}$'. By shifting this way, the relative positional relationship between the first mark $m_{a1}$' and the second mark $m_{a3}$' is equal to the relative positional relationship between the first mark $m_{a1}$, and the second mark $m_{a3}$; as a result, it may become possible to adequately correct the printed positional shift amounts generated in the forward and backward scannings.

According to an embodiment of the present invention, the correction is performed by correcting the drive of the recording head 34, more specifically, by changing the position of the nozzle to be driven from plural nozzles on the recording head 34 and/or by changing the ejection timing of ink liquid from the nozzle. Herein, it is assumed that a single nozzle is used to form a mark such as the first marks $m_{a1}$ and $m_{a1}$'.

In this case of FIG. 13B, the recording head 34 has plural nozzle lines (more specifically 14 lines in the Xs direction and 8 lines in the Ys direction) and it is assumed that, before the correction is performed, the nozzle to be driven to print the first mark $m_{a1}$ is nozzle $n_1$ ((4,3) in the Xs-Ys coordinates). When the correction described above is performed, it is necessary to use the nozzle at the (coordinates) position shifted from the first mark $m_{a1}$ by "+α" in the Xs direction and by "+β" in the Ys direction. Therefore, the nozzle at the corrected coordinates (4+α,3+β) is to be used. In this case of FIG. 13B, the nozzle $n_1$'(7,4) corresponds to the corrected coordinates $(4+\alpha, 3+\beta)$. Further, there may be a case where there is no exact nozzle at the corrected coordinates. In such a case, the nozzle closest to the corrected coordinates may be used.

Further, as another correction method, the recorded positional shift amounts in the main-scanning direction and in the sub-scanning direction may be adjusted by, for example, adjusting the ejection timing of ink liquid, changing the nozzle to be used to eject ink liquid or the like or any combination thereof.

As described above, according to an embodiment of the present invention, it may become possible to detect the printed positional shift amounts both in the main-scanning direction and in the sub-scanning direction caused by forward and backward scannings of the recording head 34 based on the difference between a predetermined offset amount between the first mark and the second mark (e.g., between "$m_{a1}$" and "$m_{a3}$" and between "$m_{a2}$" and "$m_{a4}$") and the actual offset amount thereof. Further, based on the detection result, it may become possible to adequately correct the recorded positional shift amounts.

Figure 14:
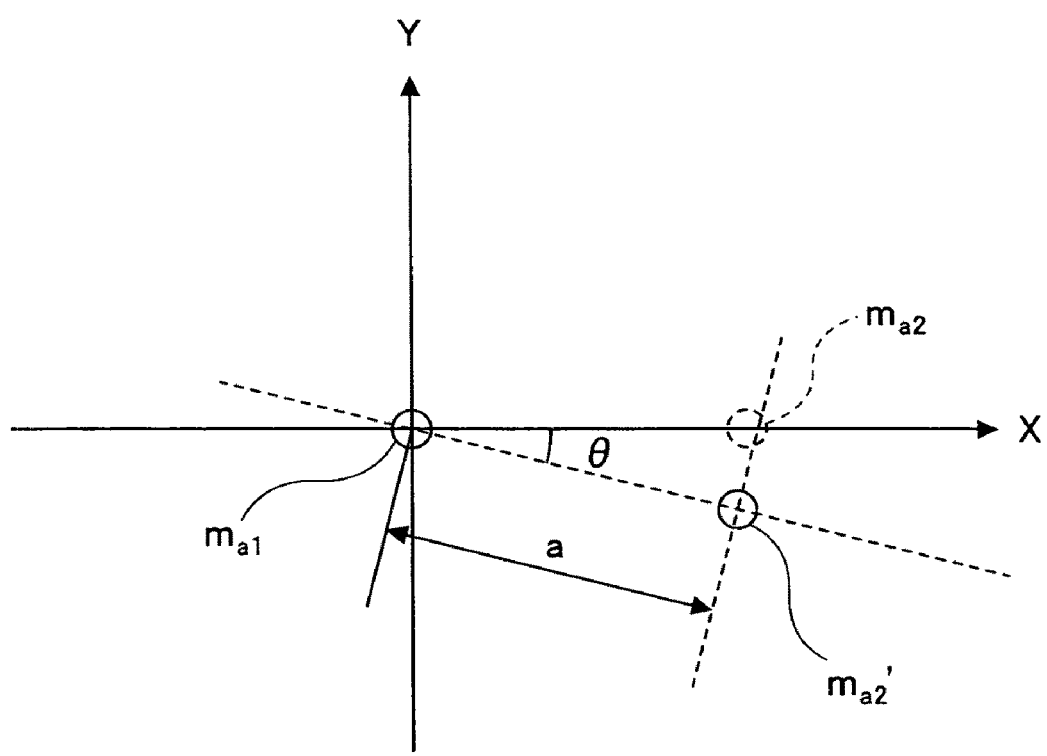
FIG. 14 is a drawing showing an example of the calibration image data of the first test pattern formed on the sheet when the recording head is inclined and imaged by the imaging unit of the image forming apparatus according to an embodiment of the present invention.

Next, FIG. 14 shows an example of the calibration image data of the first test pattern imaged by the imaging unit, the first test pattern being imaged under the condition that the recording head 34 (carriage 33) is inclined at the angle of "θ" caused by the forward and backward scannings as shown in FIG. 5. In FIG. 14, the combination of the first marks $m_{a1}$ and $m_{a2}$ is used to obtain the inclination amount (angle) of the recording head in the forward scanning. On the other hand, by using the second test pattern (combination of the first marks $m_{a1}$ and $m_{a2}$), the inclination amount (angle) of the recording head in the backward scanning can be obtained.

In FIG. 14, when the recording head 34 (carriage 33) is not inclined, the angle between a line drawn between the first mark $m_{a1}$ and the other first mark $m_{a2}$ and the reference axis X is zero (0) degree. However, when the recording head 34 is inclined at the angle of "θ" in the actual forward scanning, the actual printed position of the first mark $m_{a2}$ is shifted to the position of the first mark $m_{a2}$' rotated by "−θ" with respect to the X axis (herein, the rotation direction is defined as positive (+) upon counterclockwise rotation and negative (−) upon clockwise rotation).

Therefore, in this case, it may become possible to detect the inclination amount (angle) of the recording head 34 based on the angle between the line drawn between the center position of the first mark $m_{a1}$ and the center position of the first mark $m_{a2}$' and the X axis.

Figure 15B:
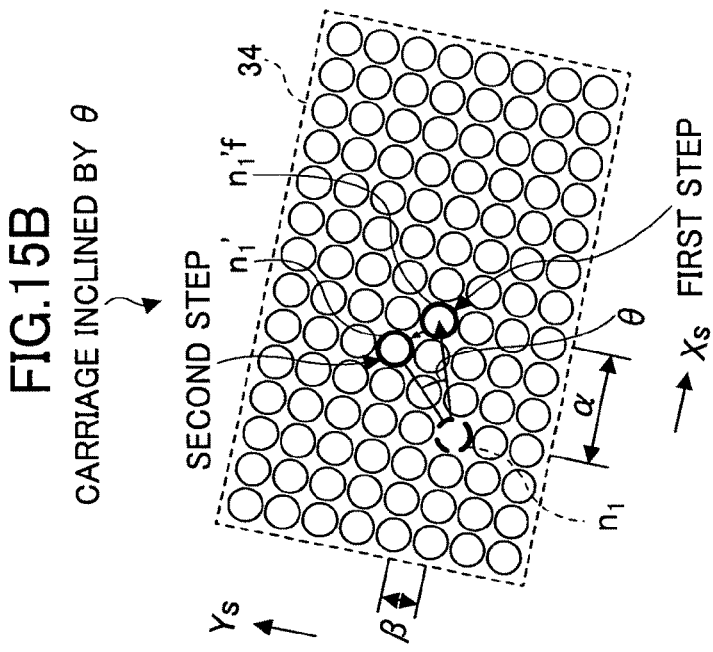
FIG. 15B is a drawing showing how an appropriate nozzle to be used in the recording head is selected as a result of the correction based on the calibration image data in FIG. 14.
Figure 15A:
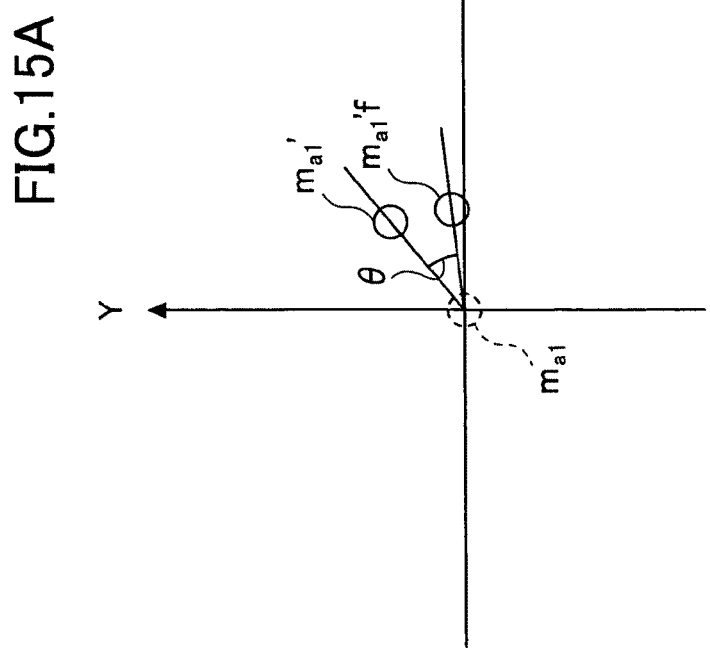
FIG. 15A is a drawing showing a target dot image pattern to be formed on a sheet as a correction result based on the calibration image data of FIG. 14.

Next, the effectiveness of the detection and the correction of the inclination amount "θ" of the recording head 34 is described with reference to FIGS. 15A and 15B. In FIGS. 15A and 15B, it is assumed that the recording head 34 (carriage 33) is inclined at the angle of "θ" as shown in FIG. 5, and FIG. 15A shows an image pattern to be printed on the sheet 42 as a result of the correction to be performed. FIG. 15B shows a concept of the correction from the viewpoint of selecting the nozzle to be used on the recording head 34 as a result of the correction.

Herein, it is assumed that the recording head 34 (carriage 33) is inclined at the angle of "θ" during the forward scanning, and the recorded positions are shifted between the forward scanning and the backward scanning as shown in FIG. 13A.

First, a case is described where no inclination of the recording head 34 is detected (i.e., θ=0). In this case, as described above when the recorded positional shift amounts are detected to be corrected based on the dot image pattern of FIG. 13A, the recorded positional shift amounts between the forward scanning and the backward scanning (α: in the main-scanning direction, β: in the sub-scanning direction) are detected. Then, based on the detected recorded positional shift amounts (α, β), the correction is performed at the recording head 34 side as shown in FIG. 13B. In this correction, the recording head 34 recognizes the Xs direction which is the column direction as the main-scanning direction and the Ys direction which is the row direction as the sub-scanning direction. Therefore, as shown in FIG. 13B, the corrected position of the nozzle $n_1$' to be used is determined by shifting from the position of the (original) nozzle $n_1$ by "α" in the Xs direction and by "β" in the Ys direction. In a case of FIGS. 13A and 13B where the recording head 34 (carriage 33) is not inclined, the main-scanning direction Xs and the sub-scanning direction Ys recognized by the recording head 34 correspond to the main-scanning direction and the sub-scanning direction, respectively, on the sheet 42. Therefore, it is not necessary to perform further correction to respond to the inclination of the recording head 34.

However, in a case where the recording head is inclined by "θ" (θ≠0), if the correction as shown in FIGS. 13A and 13B alone be performed, in the Xs-Ys coordinate system of the recording head 34, the nozzle $n_1$'f $(4+\alpha, 3+\beta)$ is selected as a result of the correction simply by shifting the position of the (original) nozzle $n_1$ (4,3) by "+α" in the Xs direction and by "+β" in the Ys direction.

However, if this nozzle $n_1$'f $(4+\alpha, 3+\beta)$ is driven and used to form the dot image, the position of the formed first mark $m_{a1}$'f becomes inadequate because the position of the formed first mark $m_{a1}$'f is rotated with respect to the first mark $m_{a1}$ by −θ degrees (rotated in the clockwise direction) from the target (correct) position of the first mark $m_{a1}$' as shown in FIG. 15A.

To overcome the problem, according to an embodiment of the present invention, it becomes possible to adequately correct the recorded positional shift amount caused by the inclination of the recording head 34 by the following steps.

In the first step, based on the positional shift amounts (+α, +β) obtained from the positions of the dot images in the forward scanning and the backward scanning of the calibration image data, primary corrected coordinates $(4+\alpha, 3+\beta)$ of the nozzle $n_1$'f are provisionally obtained by shifting from the (original) coordinates of the nozzle $n_1$ (4,3) by "+α" in the Xs direction and by "+β" in the Ys direction. In this case, the coordinates (7,4) correspond to the coordinates $(4+\alpha, 3+\beta)$ of the nozzle $n_1$'f.

In the second step, based on the inclination amount (angle "−θ") of the recording head 34 in the forward scanning obtained from the calibration image data, secondary corrected coordinates are obtained by rotating the position $(4+\alpha, 3+\beta)$ of the nozzle $n_1$'f by the angle "+θ" with respect to the position of the nozzle $n_1$ (as the center point of the rotation). In this case, the coordinates (6,5) are selected as the coordinates closest to the obtained secondary corrected coordinate and therefore, the coordinates (6,5) are selected as the finally corrected (selected) nozzle $n_1$'.

When the selected nozzle $n_1$' is driven and used to form the dot image, it may become possible to correct the inclination amount (angle) of the recording head in the forward scanning and form the first mark $m_{a1}$' obtained by correcting the record positional shift amounts between the forward scanning and the backward scanning (see FIG. 15A).

In a manner similar to the above, it may be possible to correct the recorded positional shift amounts in the backward scanning by detecting the inclination amount (angle) of the recording head 34 based on the actual dot image of the second test pattern (i.e., the second marks $m_{a3}$ and $m_{a4}$).

Further, as the method of the correction, for example, such a method may be used that both the ejecting timing of the ink liquid from the recording head 34 and the nozzle position to be used to eject ink liquid are simultaneously adjusted or the carriage 33 itself is mechanically adjusted.

As described above, according to an embodiment of the present invention; based on the difference between the predetermined offset amount between the first mark and the second mark (e.g., between the $m_{a1}$ and $m_{a3}$ and between the $m_{a2}$ and $m_{a4}$) that are formed by the same nozzle of the recording head 34 and the actual offset amount, it may become possible to detect the recorded positional shift amounts in both main-scanning direction and the sub-scanning direction with respect to the forward scanning and the backward scanning of the recording head 34.

Further, according to an embodiment of the present invention, based on the relative inclination (angle) difference between "the inclination of the line drawn between the two first marks $m_{a1}$ and $m_{a2}$" and "the inclination of the corresponding coordinate axis in the imaging apparatus", it may become possible to detect the inclination amount (angle) of the recording head in the forward scanning.

In the same manner, according to an embodiment of the present invention, based on the relative inclination (angle) difference between "the inclination of the line drawn between the two second marks $m_{a3}$ and $m_{a4}$" and "the inclination of the corresponding coordinate axis in the imaging apparatus", it may become possible to detect the inclination amount (angle) of the recording head in the backward scanning.

Further, based on the detected recorded positional shift amounts and the inclination amount (angle) of the recording head 34, it may become possible to adjust the inclination amounts (angles) both in the forward scanning and in the backward scanning to fit to the reference coordinates (main-scanning direction X and sub-scanning direction Y) of the imaging system and cancel an inclination-amount error that may be generated between the forward scanning and the backward scanning, thereby adequately correcting the recorded positional shift amounts.

Further, when an image forming apparatus has a relatively long length (size) in the main-scanning direction, the recorded positional shift amounts and the inclination angle of the carriage are likely to vary depending on the positions along the main scanning direction. In such a case, it is preferable to perform the test pattern printing step and the imaging step several times at different positions along the main-scanning direction.

In other words, at plural positions along the main-scanning direction of the recording medium (sheet 42), the detection unit (CPU 101) may detect the recorded positional shift amounts of the dot images (the first marks) in the forward scanning and the dot images (the second marks) in the backward scanning and the inclination amounts (angles) of the recording head (recording head 34) both in the forward scanning and in the backward scanning. Further, in this case, the imaging unit (imaging apparatus 37) images the calibration image data at each of the plural positions along the main-scanning direction of the recording medium while the imaging unit is stopped at the corresponding position.

Figure 17:
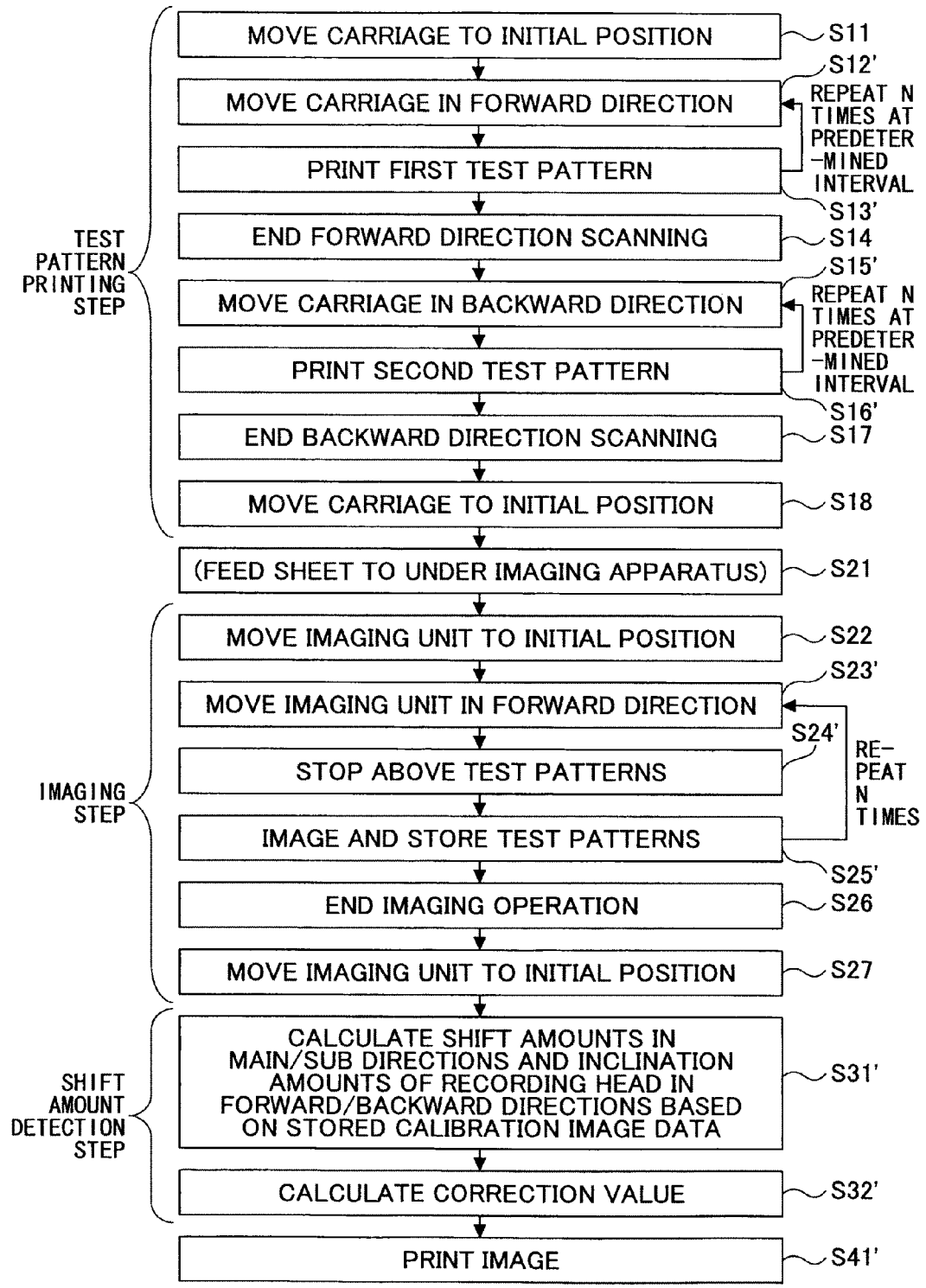
FIG. 17 is a second flowchart showing a process of correcting the shift of recorded dot positions in the image forming apparatus according to an embodiment of the present invention.

FIG. 16 shows an image forming apparatus capable of detecting the test pattern at plural positions along the main-scanning direction. The configuration of the image forming apparatus in FIG. 16 is the same as that in FIG. 8. Further, FIG. 17 is a flowchart showing a process of correcting the recorded positional shift amounts in the image forming apparatus of FIG. 16. In FIG. 17, the same reference numerals are used for the same processes in FIG. 11. In the following, only the processes different from those in FIG. 13 are described with reference to FIGS. 16 and 17.

Test Pattern Printing Step

In step S12', while the carriage 33 is moved in the forward direction (directed to the left-hand side along the X axis), ink is ejected from the recording head 34 at a predetermined position in a corresponding area based on the ejection timing control by the head driver 108. At that time, the ejection timing is controlled by a driving waveform generated based on the data stored in the ROM 102. As a result, in step S13', the first marks $m_{a1}$ and $m_{a2}$ as the first test pattern are printed. Then, the carriage 33 is sequentially moved to the areas "g", "f", "e", "d", and "c" one by one, and at each of the areas, the process described above is repeated.

In step S15', while the carriage 33 is moved in the backward direction (directed to the right-hand side along the X axis), ink is ejected from the recording head 34 at a predetermined position in a corresponding area (which is shifted by the offset amount "b" from the first marks $m_{a1}$ and $m_{a2}$ along the main-scanning direction) based on the ejection timing control by the head driver 108. At that time, the ejection timing is controlled by a driving waveform generated based on the data stored in the ROM 102. As a result, in step S16', the second marks $m_{a3}$ and $m_{a4}$ as the second test pattern are printed. Then, the carriage 33 is sequentially moved to the areas "c", "d", "e", "f", and "g" one by one, and at each of the areas, the process described above is repeated.

Imaging Step

In step S23', the imaging apparatus carriage 38 is moved in the backward direction along the main-scanning direction.

In step S24', the imaging apparatus carriage 38 is stopped at the position where the imaging apparatus 37 is right above the first marks $m_{a1}$ and $m_{a2}$ and the second marks $m_{a3}$ and $m_{a4}$ of a predetermined area. The reason why the imaging apparatus 37 is stopped when the patterns are imaged is to prevent (reduce) the image blur that may be formed on the imaged calibration image data (pattern data). Other reasons are to prevent the inclination of the imaging apparatus 37 caused by the movement of the imaging unit and to prevent the inclination of the reference coordinates X and Y in the imaging apparatus 37.

In step S25', the imaging apparatus 37 in stop status images the dot images on the sheet 42 by the control by the imaging apparatus driver 119. At that time, the first marks $m_{a1}$ and $m_{a2}$ and the second marks $m_{a3}$ and $m_{a4}$ are simultaneously imaged and obtained as the calibration image data of the prescribed area. By the control of the CPU 101, the calibration image data are stored in the NVRAM 104 serving as a storage unit.

The imaging apparatus carriage 38 is sequentially moved to the areas "g", "f", "e", "d", and "c" one by one, and at each of the areas, the above processes are repeated.

Shift Amount Detection Step

In step S31', based on the calibration image data of the areas "c", "d", "e", "f", and "g" stored in the NVRAM 104, by using a print shift amount and inclination amount detection program, the positional shift amounts between the dot image printed in the forward scanning of the recording head 34 and the dot image printed in the backward scanning of the recording head 34 (i.e.; the shift amounts of the recorded positions in the main scanning direction and the sub-scanning direction) and the inclination amounts of the recording head 34 in the forward scanning and the backward scanning with respect to each of the areas "c", "d", "e", "f", and "g" are calculated.

In step S32', based on the calculation result in step S31', the correction values of the predetermined sections corresponding to the areas "c", "d", "e", "f", and "g" are calculated to correct the drive of the recording head 34. Herein, to correct the drive of the recording head 34 refers to correcting the positions of the nozzles to be driven of the nozzle lines of the recording head 34 and/or correcting the ink ejection timings from the nozzles.

Image Forming Step

In step S41', the correction values calculated in step S32' are reflected for the driving of the recording head 34 and the image is formed based on the input image data in the predetermined areas corresponding to the areas "c", "d", "e", "f", and "g" in the main-scanning direction. By doing this, it may become possible to correct the shift amount between the printing positions in the forward scanning and the printing positions in the backward scanning, thereby enabling preventing the degradation of image quality. By further correcting the inclination amount (angle) of the recording head 34 (carriage 33) in the forward scanning and the backward scanning, it may become possible to perform more accurate correction between the printing positions in the forward scanning and the printing positions in the backward scanning. Particularly, the recorded positional shift amounts and the inclination amounts (angles) of the recording head are detected and corrected in the plural positions along the main-scanning direction. Therefore, it may become possible to form a high-quality image having higher positional accuracy even in a recording apparatus having a relatively long size in the main-scanning direction.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a recording head having a plurality of nozzles ejecting ink onto a recording medium, the nozzles constituting nozzle lines arranged in a sub-scanning direction parallel to a feeding direction of the recording medium and in a main-scanning direction orthogonal to the feeding direction, the recording head being configured to scan in a forward scanning direction and in a backward scanning direction along the main scanning direction to form dot images on the recording medium;
    an imaging unit configured to image the dot images at a predetermined position on the recording medium;
    a detection unit configured to detect a positional shift amount of the dot images formed in a forward scanning of the recording head, a positional shift amount of the dot images formed in a backward scanning of the recording head, an inclination amount of the recording head in the forward scanning, and an inclination amount of the recording head in the backward scanning based on calibration image data obtained by imaging two first marks and two second marks in a single view by the imaging unit, the two first marks being dot images simultaneously formed on the recording medium while the recording head is moved in the forward scanning direction by using different nozzles arranged in a same nozzle line in the main scanning direction, the center positions of the first marks being detectable, the two second marks being dot images simultaneously formed on the recording medium while the recording head is moved in the backward scanning direction by using the same nozzles having been used to form the first marks and by setting an offset value corresponding to a predetermined distance from the first marks, the center positions of the second marks being detectable; and
    a correction unit configured to correct a drive of the recording head based on the positional shift amounts and the inclination amounts of the recording head detected by the detection unit.

2. The image forming apparatus according to claim 1, wherein
    the imaging unit images the calibration image data while the image unit is stopped.

3. The image forming apparatus according to claim 1, wherein
    the positional shift amount is obtained based on a positional relationship between the first mark and the corresponding second mark in the calibration image data, the first mark and the second mark having been formed by using a same nozzle.

4. The image forming apparatus according to claim 1, wherein
    the inclination amount of the recording head in the forward scanning is obtained based on a positional relationship between the two first marks in the calibration image data, and
    the inclination amount of the recording head in the backward scanning is obtained based on a positional relationship between the two second marks in the calibration image data.

5. The image forming apparatus according to claim 1, wherein
    the correction unit corrects one or both of a position of a nozzle to be driven in the nozzle lines and an ejection timing of the nozzle.

6. The image forming apparatus according to claim 1, wherein
    the detection unit detects the positional shift amount of the dot images formed in the forward scanning of the recording head, the positional shift amount of the dot images formed in the backward scanning of the recording head, the inclination amount of the recording head in the forward scanning, and the inclination amount of the recording head in the backward scanning at plural positions in the main scanning direction of the recording medium.

7. The image forming apparatus according to claim 6, wherein
    the imaging unit images the calibration image data at the plural positions in the main scanning direction of the recording medium while the image unit is stopped.

* * * * *